US011755451B2

United States Patent
Doni et al.

(10) Patent No.: US 11,755,451 B2
(45) Date of Patent: Sep. 12, 2023

(54) METHOD AND APPARATUS FOR TUNING ADJUSTABLE PARAMETERS IN COMPUTING ENVIRONMENT

(71) Applicant: AKAMAS S.R.L., Milan (IT)

(72) Inventors: Stefano Doni, Milan (IT); Giovanni Paolo Gibilisco, Milan (IT); Stefano Cereda, Milan (IT)

(73) Assignee: AKAMAS S.P.A., Milan (IT)

( * ) Notice: Subject to any disclaimer, the term of this patent is extended or adjusted under 35 U.S.C. 154(b) by 666 days.

(21) Appl. No.: 16/818,263

(22) Filed: Mar. 13, 2020

(65) Prior Publication Data

US 2020/0293835 A1    Sep. 17, 2020

(30) Foreign Application Priority Data

Mar. 13, 2019    (IT) .................. 102019000003667

(51) Int. Cl.
*G06F 11/34*    (2006.01)
*G06N 20/00*    (2019.01)
(Continued)

(52) U.S. Cl.
CPC ...... *G06F 11/3442* (2013.01); *G06F 11/2289* (2013.01); *G06F 11/3409* (2013.01);
(Continued)

(58) Field of Classification Search
CPC .............. G06K 9/6257; G06V 10/764; G06V 10/7747; G06V 30/19173; G06N 20/00;
(Continued)

(56) References Cited

U.S. PATENT DOCUMENTS 7,908,119 B2    3/2011  Bondi
8,954,309 B2    2/2015  B'Far et al.
(Continued)

OTHER PUBLICATIONS

Alipourfard, Omid, et al., CherryPick: Adaptively Unearthing the Best Cloud Configurations for Big Data Analytics, Proceedings of the 14th USENIX Symposium on Networked Systems Design and Implementation, Mar. 27-29, 2017, 15 pages, [retrieved on Aug. 29, 2022], Retrieved from the Internet: <URL:https://www.usenix.org>.*

(Continued)

*Primary Examiner* — Geoffrey R St Leger
(74) *Attorney, Agent, or Firm* — NIXON & VANDERHYE

(57) ABSTRACT

A computer-implemented method is carried out on an IT framework and a relative apparatus including: an orchestrator module; an optimizer module; a configurator module; a load generator module; and a telemetry module. The method includes: identifying tunable parameters representing a candidate configuration for a System Under Test (SUT), and applying the candidate configuration to the SUT using the configurator module; performance testing the SUT to determine a performance indicator; supplying performance metrics to the optimizer module's machine learning model to generate an optimized candidate configuration. The model provides as output, in correspondence of a candidate set of parameters, an expected value of the performance indicator and a prediction uncertainty thereof, used by the optimizer module to build an Acquisition Function used to derive a candidate configuration and by the load generator module to build the test workload. The test workload is computed through the machine learning model.

19 Claims, 19 Drawing Sheets

(51) Int. Cl.
  *G06F 11/22* (2006.01)
  *G06F 11/36* (2006.01)
  *G06F 18/2415* (2023.01)
  *G06F 18/214* (2023.01)
  *G06N 7/01* (2023.01)

(52) U.S. Cl.
  CPC ...... *G06F 11/3428* (2013.01); *G06F 11/3684* (2013.01); *G06F 18/2148* (2023.01); *G06F 18/24155* (2023.01); *G06N 7/01* (2023.01); *G06N 20/00* (2019.01)

(58) Field of Classification Search
  CPC . G06N 7/005; G06F 11/2289; G06F 11/3428; G06F 11/3672; G06F 11/3684; G06F 11/3688; G06F 11/3692
  USPC .......................................................... 706/46
  See application file for complete search history.

(56) References Cited

U.S. PATENT DOCUMENTS

| | | | |
|---|---|---|---|
| 9,143,554 B2 | 9/2015 | Liu et al. | |
| 9,800,466 B1 | 10/2017 | Rangole | |
| 9,958,931 B2 | 5/2018 | Morad | |
| 2004/0210884 A1† | 10/2004 | Raghavachari | |
| 2006/0047794 A1 | 3/2006 | Jezierski | |
| 2010/0199267 A1 | 8/2010 | Rolia et al. | |
| 2012/0060146 A1 | 3/2012 | Maurer | |
| 2012/0310618 A1† | 12/2012 | B'Far | |
| 2014/0351412 A1* | 11/2014 | Elisha | G06F 11/3452 709/224 |
| 2017/0200091 A1 | 7/2017 | Britton et al. | |
| 2017/0286282 A1* | 10/2017 | Simpson | G06F 8/76 |
| 2018/0246558 A1† | 8/2018 | Morad | |
| 2018/0349158 A1 | 12/2018 | Swersky et al. | |

OTHER PUBLICATIONS

Italian Search Report, dated Nov. 29, 2019, from corresponding Italian application No. 201900003667.
Shahriari et al.; Taking the Human Out of the Loop: A Review of Bayesian Optimization; Proceedings of the IEEE Jan. 2016; pp. 148-175; vol. 104, No. 1.

* cited by examiner
† cited by third party

METHOD AND APPARATUS FOR TUNING ADJUSTABLE PARAMETERS IN COMPUTING ENVIRONMENT

FIELD OF THE INVENTION

The present invention relates to a method and apparatus for tuning adjustable parameters in a computing environment. In particular, a method and apparatus which is able to automatically tune adjustable parameters affecting the performance of an IT system.

BACKGROUND

The configuration of modern IT systems is a key activity to optimize performance or reduce running costs. Recent trends introduce new challenges to performance analysts: indeed, the number of layers in IT systems is increasing (e.g. containers and cloud services) and each layer in the IT stack exposes hundreds of parameters, whose optimal configurations are often workload-specific. As a result, many production systems are run with default settings, since manual tuning of such a number of parameters is highly demanding if at all possible, leaving significant performance or cost improvements on the table.

Prior Art

The problem of providing an automatic application for tuning adjustable parameters of IT infrastructures has been already addressed in the prior art. Some solutions have been disclosed, either offering partial solutions to specific tuning problems or describing at a very high level, as a way of principle, some optimizing approaches without suggesting proper enabling embodiments which can be safely and reliably implemented in the real world.

For example, U.S. Pat. No. 9,958,931 discloses a self-tuning method for the computing system. The method relies on a system-oriented workload, where the load of each "application layer" is defined with a different workload, typical of that application layer; the workload is mapped to buckets and for each bucket, a (sub) set of optimal parameters has been previously defined in same way (list of optimization schemes that are known to optimize certain workload buckets). A subset of parameters is tuned hierarchically (the hierarchy is defined a priori by using some explicit knowledge). There is no specific suggestion on a method most suitable for optimization, while a plurality of optimization schemes is suggested, one of them being chosen in each bucket.

U.S. Pat. No. 9,800,466 discloses a technology for generating and modifying tunable parameter settings for use with a distributed application. It is generally disclosed the use of a machine learning model for obtaining a second set of tunable parameter settings based on performance metrics and implementation attributes associated with a distributed application using a first set of tunable parameter settings selected on the basis of historical data.

US20120060146 relates to a method of automatically tuning a software application. The method provides to use test parameters and scoring them based on log value and improvement goal. The scored results are stored and then combined with other parameters until a desired criterion is met. It is also disclosed an embodiment where it is made use of a hypothesizer configured to combine the first parameter set with the selected parameter set to produce a second parameter set based on a genetic algorithm.

U.S. Pat. No. 8,954,309 discloses techniques for tuning systems, based on the generation of configurations for effective testing of the system. It is disclosed that machine learning techniques may be used to create models of systems and those models can be used to determine optimal configurations.

Other automatic tuning systems are disclosed in US2017200091, U.S. Pat. Nos. 7,908,119, 9,143,554, and US20060047794.

US20100199267 discloses a system where optimization of the size of an infrastructure configuration is obtained through predictive models.

Parameter optimization problems are addressed also in the paper "HyperConfig: intelligent configuration search" by Timothy Chen (see https://medium.com/@tnachen/hyperpilot-open-sourced-100-of-its-products-18d0e018fe45). This paper discloses the use of Bayesian Optimization to find near optimal results with only running a few sample points instead of searching through every instance type. No specific information is disclosed on the infrastructure and cooperation of various modules.

Commercial automatic systems used to tune complex computing systems are currently available under the tradename CONCERTIO™ by Concertio Inc, New York (USA) and SKIPJAQ™ by SKIPJAQ Ltd., London (United Kingdom).

Finally, US20180349158 discloses Bayesian optimization techniques used in connection with a Java Virtual Machine performance.

In view of the above, there is still a demand for an automatic technique for optimizing the tuning of adjustable parameters in complex IT systems, like environments including a stack of different layers, like the one exemplified in FIG. 1.

It shall be noted that, in addition to the number of adjustable parameters (knobs) defined in each layer, the behavior resulting from a change of each parameter cannot be easily predicted. Indeed, a change in a single parameter can have a nonlinear or counter-intuitive effect (see the example depicted in FIG. 2A, relating to the performance of a MongoDB database) and, on top of this, there could be an high-interdependence between different parameters on any specific configuration (see the very simple 2-dimension example depicted in FIG. 2B, relating to the performance of a MongoDB database).

The proper optimization on tuning of adjustable parameters can have a dramatic effect on the performances of an IT infrastructure (see examples in FIG. 3). Moreover, high value is perceived in relation to a tuning method which is able to converge to an optimal configuration in a reliable way, being efficient in terms of resources and time required, without being affected too much by the starting conditions (cold start) and to be safely applied to the production application after having been run on a test environment.

It is hence desired to supply a method, an apparatus and a computer-readable medium which allow to get the above valuable results.

SUMMARY OF THE INVENTION

The inventors have developed an application, implemented through a method embedded in software infrastructure and apparatus, capable of leveraging machine learning techniques and automatic performance analysis to automatically suggest optimal configurations of complex IT systems including several adjustable parameters.

Embodiments disclosed in the present specification are relating toto techniques and apparatus for optimizing a tuning process of adjustable parameters in a typical IT system comprising a server infrastructure having a number of layers (stack of layers) enabling a user to handle an application through which some services are delivered: for example, a server infrastructure of a bank delivering online bank services or a server infrastructure delivering other services to consumers (like purchase recommendations, e-commerce platform, etc.). Although examples are provided herein predominantly with reference to this kind of environment, it is to be appreciated that said techniques and apparatus are not limited to such server infrastructure. For example, other devices and infrastructures that may benefit from the techniques disclosed herein may include, without limitation, mobile devices, set-top-boxes, laptops, desktop computers, navigation devices (infotainment) implemented within moving vehicles, flight management systems in aircrafts and any other similar device where adjustable parameters need to be tuned according to some performance goal.

It is understood that the method of the invention can be computer implemented. Accordingly, the invention can be enabled as a method through a computer apparatus and relative computer-readable medium storing instructions apt to drive the computer apparatus to perform the method. A computer apparatus or device can include at least a memory, a central processing unit (CPU), removable/non-removable data storage and multiple I/O devices (like keyboard, mouse, detecting devices, display, printer, . . . ).

The computer-readable medium can include data memory devices such as magnetic disks, magnetic tape, RAM, ROM, electrically erasable programmable read-only memory (EEPROM), flash memory or other memory technology, compact disk read-only memory (CD-ROM), digital versatile disks (DVD), or other optical storage and so on. It is understood however that computer-readable media, as used herein, can include not only physical computer storage media but also communication media, such as carrier wave, or another transmission mechanism.

The application of the invention can automatically select configuration parameters of any third-party IT system so as to optimize its performance.

The method is able to propose a configuration for the specific deployment of an IT system, without using generic and standard tuning guidelines, tailored around the actual workload.

It works by injecting a workload to the system, measuring multiple performance metrics and assigning to said metrics a scalar score which synthesize the performance behavior of the system for a specific, user defined, goal (e.g. maximum throughput with response time below a certain threshold, or minimum memory footprint of multi-JVM application, etc.). Then, it suggests new configuration to be tested on the IT system, automatically taking care of avoiding configurations which may result in degraded performance: this later candidate configuration is safely applied to a portion of the deployment/production system or to a test environment and the new performance metrics are measured.

In the remainder, a candidate configuration is identified as a set of values to be applied to the parameters of the SUT which might affect the performance of such a system.

According to an additional embodiment, when many IT systems have been tuned, the optimized configurations are stored in a central storage (for example either a local memory storage, or a remote memory storage or a cloud storage), so that the collected knowledge can be later exploited to speed up the tuning process of novel IT systems by looking for similar application components and workloads in the previously stored history data.

Some other embodiments of the disclosure may provide specific advantages, such as safety of the application, non-sensitiveness to background noise, cold start performances and others, but will be detailed further in the following.

Detailed features, advantages and embodiments of the invention will be set forth and become apparent from a consideration of the following detailed description, drawings, and claims. Moreover, it is understood that both the above summary of the invention and the following detailed description are exemplary and intended to provide a good explanation—to the extent required to put a skilled person in condition of enabling the invention—without limiting the scope of the invention as claimed. Various changes and modifications within the scope of the invention will become apparent to those skilled in the art from this detailed description.

BRIEF DESCRIPTION OF THE DRAWINGS

The accompanying drawings are incorporated in and constitute a part of this specification; the drawings are intended to illustrate preferred embodiments of the invention and together with the detailed description serve to explain the principles of the invention. The following detailed description of preferred embodiments is given by way of example and shall be read together with the accompanying drawings, wherein.

DETAILED DESCRIPTION OF SOME PREFERRED EMBODIMENTS

1. General Architecture of the Invention

Figure 1:
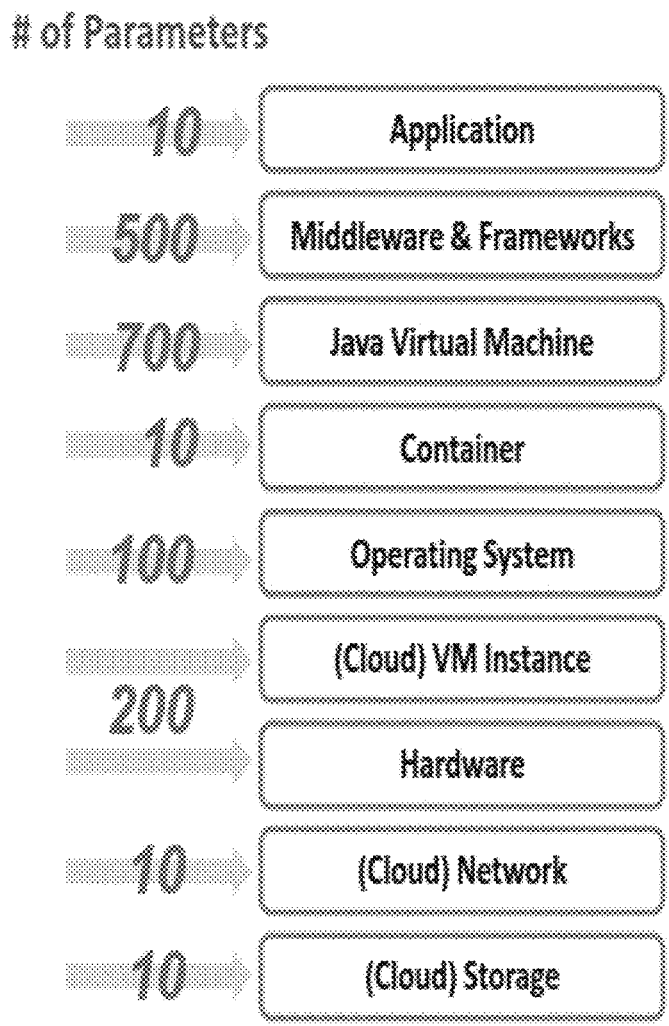
FIG. 1 is a pictorial view showing a classical IT stack and the involved configuration parameters.
Figure 2A:
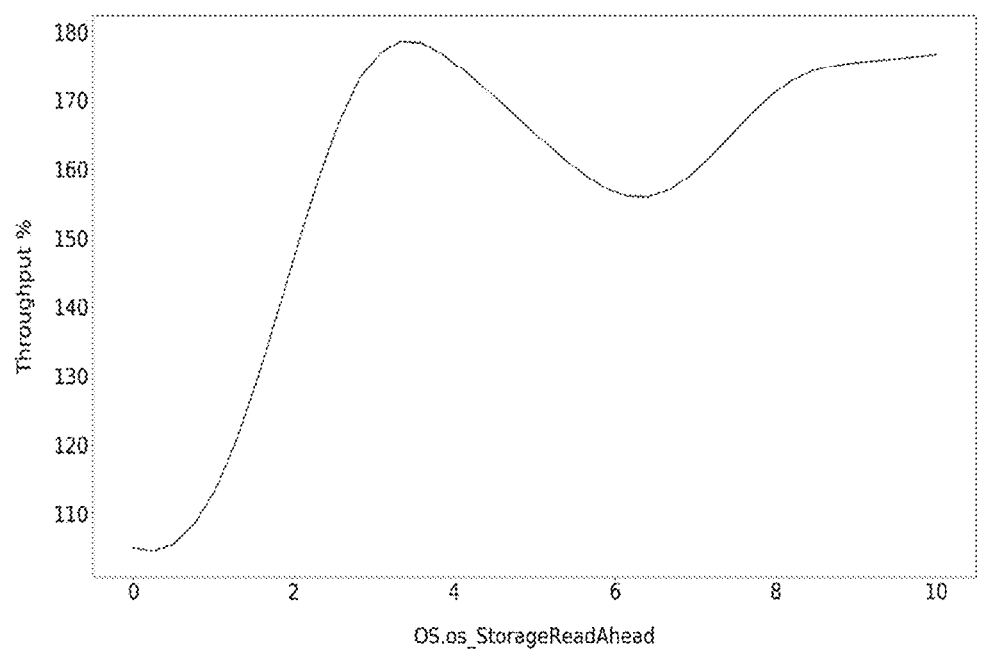
FIG. 2A is a graph representing the complex function of a performance indicator (throughput 99th percentile of latency) of an exemplifying database when a single parameter (operating system storage readaheadbuffer pool size) is modified.
Figure 2B:
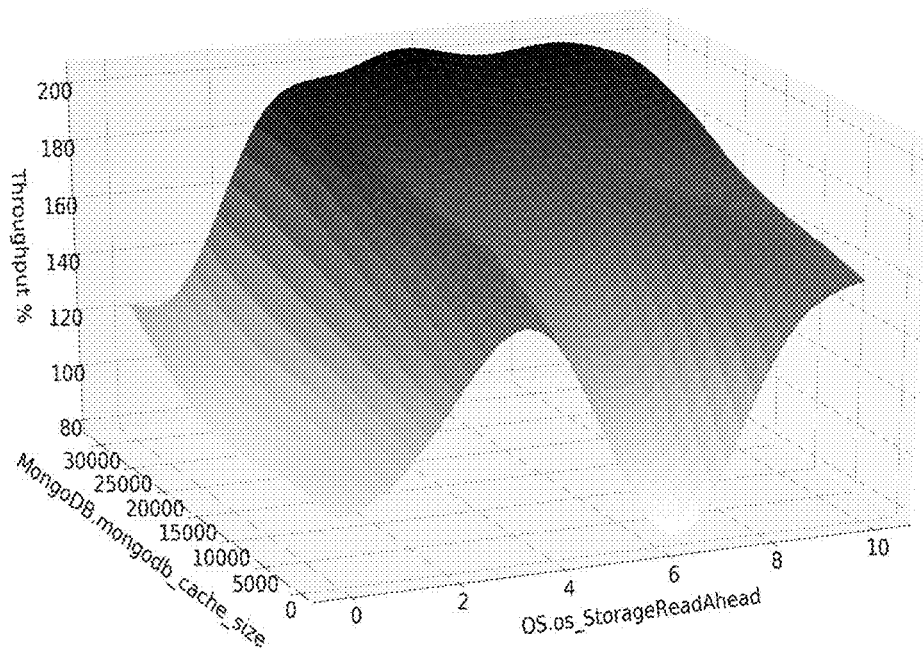
FIG. 2B is a 3D graph showing the same situation of FIG. 2A when two interacting parameters are varied.
Figure 3:
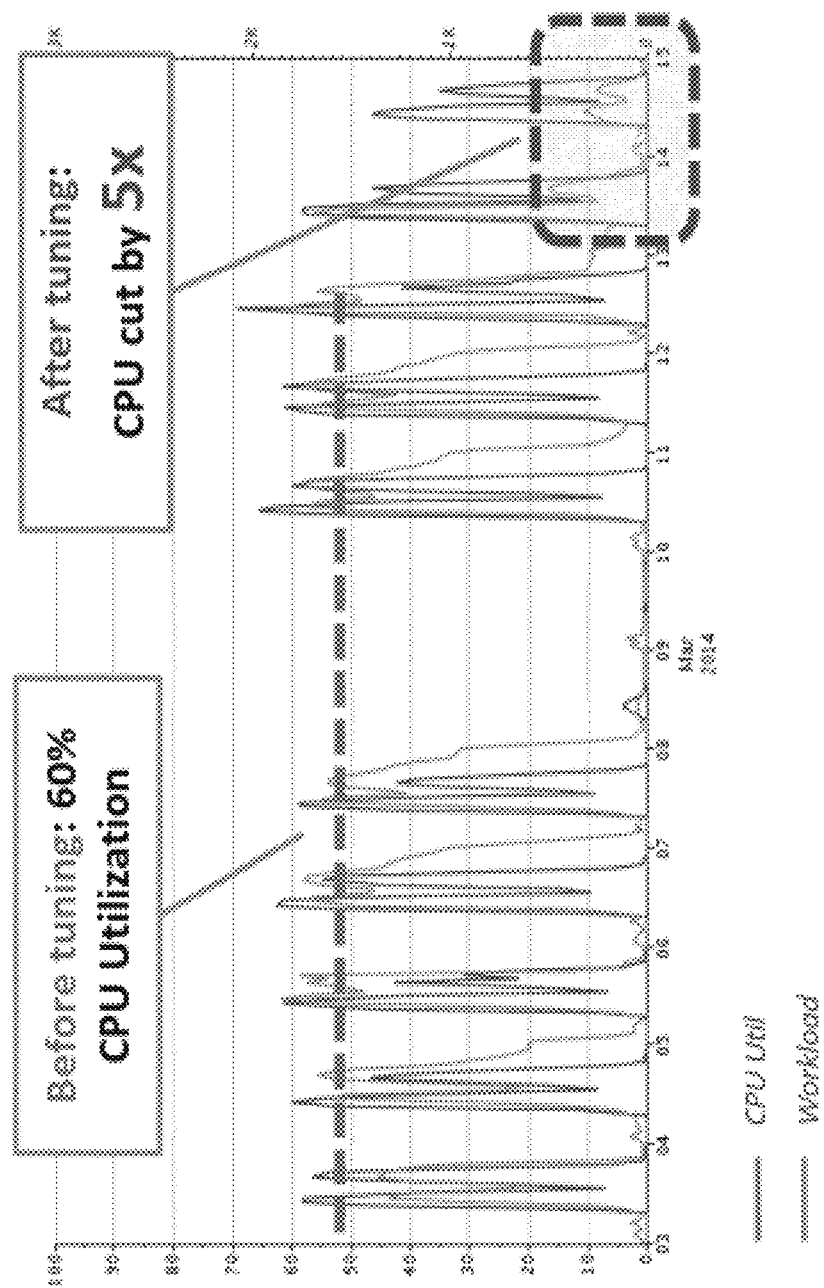
FIG. 3 is another comparative graph of the results of a real-world parameter-tuning campaign.
Figure 4:
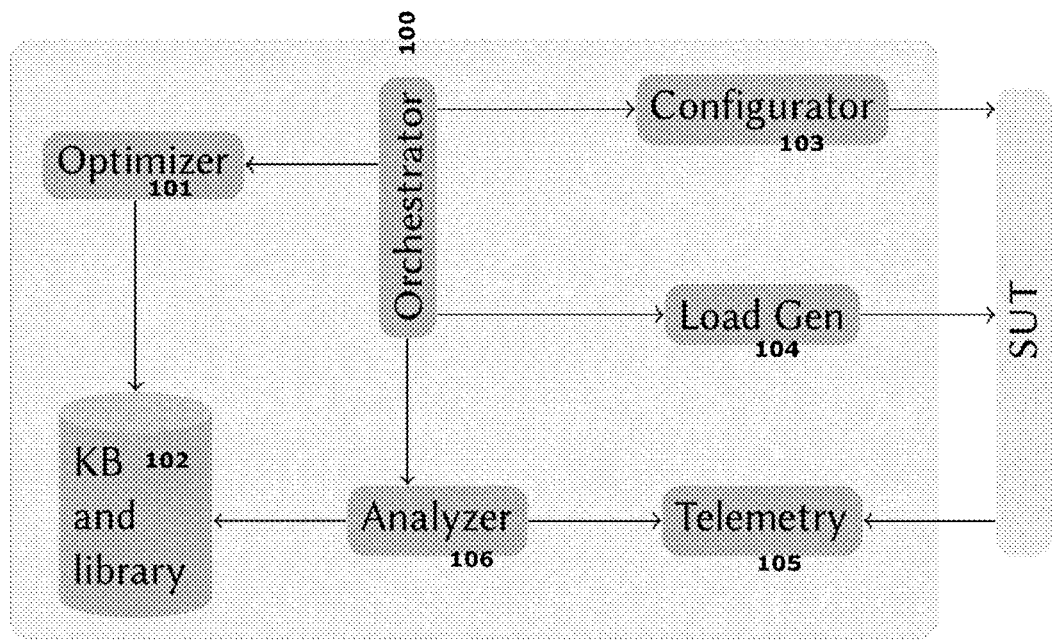
FIG. 4 is a diagram view of an architecture layout of the invention.

An apparatus, or software/hardware infrastructure, for optimizing adjustable parameters of an IT system, according to the invention is made of several modules, as depicted in FIG. 4.

An orchestrator 100 is the core of the framework and allows users to specify optimization workflows and to define the System Under Test (SUT), including the set of tunable parameters, the performance metrics of interests and a way to inject load or control the workload on the IT system as will be described below. The SUT is described in terms of its components (like an application on JVM, a VM, and an OS). A user can either define said components from scratch or choose from a library of commonly used technologies (e.g. Oracle JVM 1.8, Apache Spark, etc.), for which parameters and metrics have already been defined.

The orchestrator 100 is connected with an optimizer 101 which is in charge of generating candidate configurations to be evaluated. The optimizer 101 implements a machine learning (ML) algorithm, which can exploit knowledge of previously evaluated configurations, which are stored in a Knowledge Base 102, to generate a candidate configuration for the system.

Information in Knowledge Base (KB) 102 allows the method to re-use knowledge gathered by other optimizations and speed up the process, for example by identifying a subset of tuned parameters that have proven to have a high impact on the desired goal, which is the performance indicator which is desired to be optimized. The Knowledge Base 102 holds the information of many performance experiments or tests executed on the SUT as well as historical data gathered from similar systems. This information is used in the optimization loop to enrich the knowledge of the ML algorithm and derive more promising configurations, as will be detailed below.

The orchestrator is also connected with a configurator 103, which takes care of applying desired parameters to the SUT and initialize it, restarting the application when needed and clearing all caches and temporary resources so as to keep the running environment similar from one performance test to the other.

At the same time, the orchestrator 100 is also connected to a load generator 104, which launches a performance test on the SUT, possibly by integrating with load injection tools or load balancers for online production systems. Preferably, the apparatus of the invention is arranged so as to control the load generator 104 and drive the workload in a way that brings the SUT in a particular work regime.

A telemetry module 105 is also provided, which integrates with monitoring tools that are installed to gather high-resolution performance metrics from the SUT and which are required to analyze the behavior of the IT system under test.

Finally, an analyzer module 106 is provided between the telemetry module 105 and the orchestrator 100, which is apt to enrich information coming from the telemetry module 105 with those regarding the configuration applied to the system and computes scalar scores representing the performance of the applied test configuration.

The operation of these modules provides the following.

The orchestrator module 100 drives the process and prompt the optimizer module 101 to generate a candidate configuration to be evaluated, which is applied to the IT system under test. The optimizer module 101 includes a machine learning (ML) module, which can exploit knowledge of previously evaluated configurations, which are stored in the Knowledge Base module 102. Once the test configuration is generated, the configurator module 103 applies the selected parameters (i.e. including the selected values of said parameters) to the SUT and initialize it. The configurator module 103 also provides to restart the applications running in the SUT when needed and to perform all the actions required to keep the environment similar from one performance test to the other (e.g. clear all cache memories). When the SUT is ready to perform the test, the load generator module 104 triggers the performance test, by possibly integrating with a load testing tool, to load the SUT with a specific workload.

While the SUT runs, the telemetry component 105 keeps polling high-resolution performance metrics. When the load test is completed, the orchestrator 100 instructs the analyzer module 106 to evaluate the test results in terms of output of the performance metrics. The analyzer module 106 thus takes the metrics collected by the telemetry module 105 and processes them. The processing consists of aggregations and enrichments with metadata containing information on the particular system configuration. The analyzer module 106 also computes scalar scores representing the performance of the applied parameter vector—i.e. the vector representing the current values of parameters—which will be consequently used by the optimizer module 101 for future configurations. All the information is then stored in the Knowledge Base module (KB) 102 and the control is given back to the orchestrator module 100, which begins a new iteration of the test process and prompt the optimizer module 101 to supply next configuration to evaluate.

In the following, it is now supplied a more detailed overview of the optimization process responsible of (i) determining which parameters to optimize, (ii) selecting a test configuration to evaluate, (iii) determining how to load the IT system, (iv) assigning a performance score to the evaluated test configuration. Further, as explained below, special care is given to handling noise and assuring the safety of the process.

Before tuning a new IT system, it is preferably provided to perform some preliminary data gathering. This is done by running the IT system with its default parameter configuration to assess the current performance of the IT system and use it as a reference or starting value for other tests: this configuration is referred to as the baseline.

Figure 5:
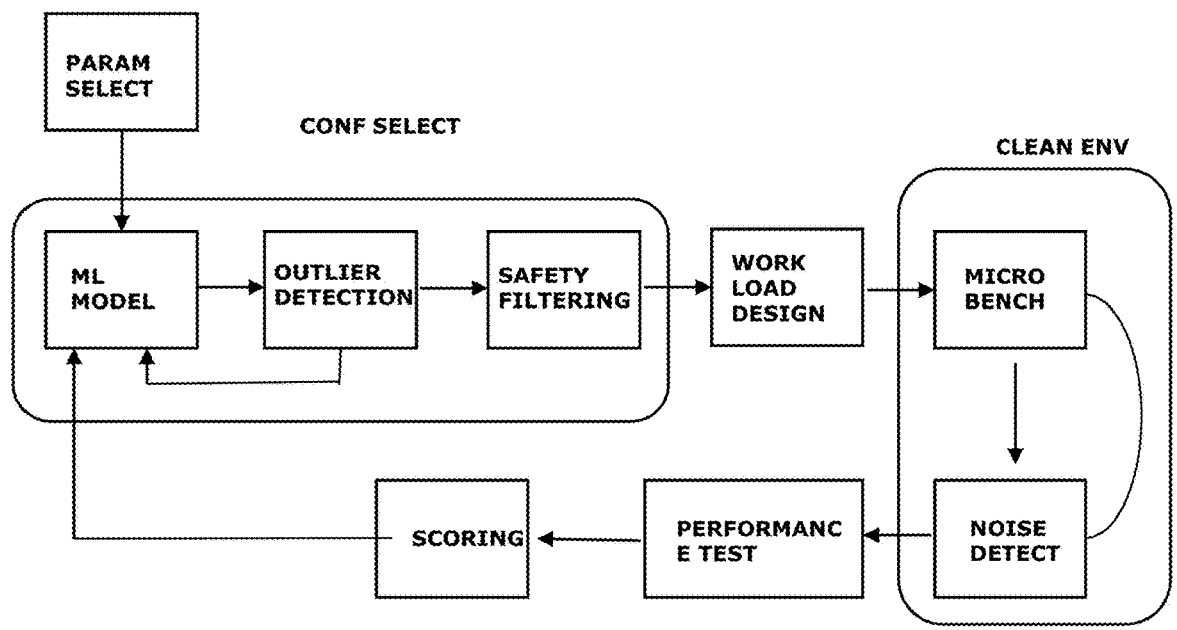
FIG. 5 is a flow diagram of the optimization process of the invention.

When optimizing a new system, a first step of the process (see FIG. 5) provides to select a number of adjustable parameters to be tuned. This procedure is outlined in the 'Parameter Selection' section below. The general approach can be to select parameters which have been observed as having a relevant influence on similar IT systems, either because they were effective in removing some bottlenecks or had a great impact on the defined goal. If safety is a critical issue (e.g. when tuning production systems), the process removes from the tunable parameters those which have a potentially high impact on performance but occasionally lead to substantial performance degradation with respect to the baseline.

When the set of tunable parameters have been identified, the process proceeds with a 'Configuration Suggestion' step. In this phase, a machine learning (ML) model able to select a configuration to be tested is built. According to the invention, the ML module within the optimizer module 101 is designed to use a Bayesian Optimization technique which trades off the exploitation of configurations known to be good and the exploration of unknown configurations. In this way, the method of the invention selects configurations which are both well-performing and at least partly informative about the system reaction to parameter changes. The ML model used by a preferred method of the invention is described in the below section 'Configuration suggestion'.

Using Bayesian Optimization with Gaussian Processes (GP) is one of the key aspects of the invention since such a technique allows to derive precious information on the outcome of different candidate configurations before applying them to the SUT. Such information is used to implement many of the features described in the following sections such as noise reduction, safety techniques, and workload design. Albeit Bayesian Optimization with Gaussian Processes is already known per se, the solution of the invention provides to build an extension method on top of such models to derive new capabilities, explained in the following, so as to exploit the knowledge gathered during past optimizations to speed up new ones.

The output of the ML module is used to perform an Outliers Detection step and discard individual measurements which are severely affected by noise, as described in the below section 'Noise reduction by re-evaluation'.

Moreover, the process applies a Safety Filtering procedure to the ML module in order to avoid that the optimization under the ML module generates a candidate configuration which might cause unpredictable performance as this might cause a risk to the system, as described in below section 'Safer optimization by uncertainty management'.

Once the candidate configuration is generated, it is applied to the SUT and a test is prepared. In some circumstances, it is possible to properly control the workload submitted to the system: being able to predict the expected performance of a configuration, together with its uncertainty, using the ML module, the process can speed up a test and improve its reliability by adapting the workload to be input in the SUT in order to stress the IT system under certain conditions (e.g. a specific range of throughput). This is described in section 'Workload design'.

Further, before running the actual performance test, the health status of the SUT is evaluated by running some micro-benchmarks. The information collected through such micro-benchmarks gives a clear picture of the conditions of the SUT and it can highlight performance issues that are not caused by the optimization process itself, a particular configuration or the workload. This information can be used in the Noise Detection step to build a model of the underlying background noise of the IT system environment and determine if the performance test can be either performed normally, or if more repetitions are needed to reduce the effect of this noise or if the environment is too uncertain and the performance test shall be postponed. This procedure is outlined in Section 'Micro-benchmarking for environment sanity check'.

Afterward, the actual Performance Test is then run on the IT system in order to evaluate the performance of a candidate configuration with respect to the user-defined goal. This is done by integrating different performance testing tools or using a procedure defined by the user.

Once the performance test is completed, various techniques are used to aggregate telemetry data collected during the test and detect its performance score within the analyzer module 106. The score is fed back to the optimizer module 101 and used in the computation of the next test configuration for the system, closing the optimization loop within the process.

2. Parameter Selection

A real IT system includes a multitude of adjustable parameters, usually in the order of hundreds or thousands. Acting on all of them, trying all the allowed values, would require the execution of a huge number of experiments (i.e. performance tests on the IT system) to find the optimal configuration, which would become practically unaffordable. Therefore, the method of the invention provides an automatic parameter selection stage based on historical data, so as to focus the process only on promising parameters. Since this step of the optimization process works on historical data it is only performed when such data is available, as an example when a new version of an application is released and needs to be tuned.

Three different strategies can be used to select relevant parameters:
 a) Goal-guided selection: identify parameters that affect the performance goal the most;
 b) Performance-guided selection: identify parameters that affect bottleneck resources;
 c) Risk-averse selection: identify and remove risky parameters.

The method allows the user to decide whether to tune all the parameters, to manually select only the desired ones or to use one of the above three automatic strategies or a combination thereof. For instance, the user could include all the parameters affecting bottlenecks and performance goal and then remove risky ones, or the user could manually select some parameters and then add the performance goal-affecting ones.

Figure 6A:
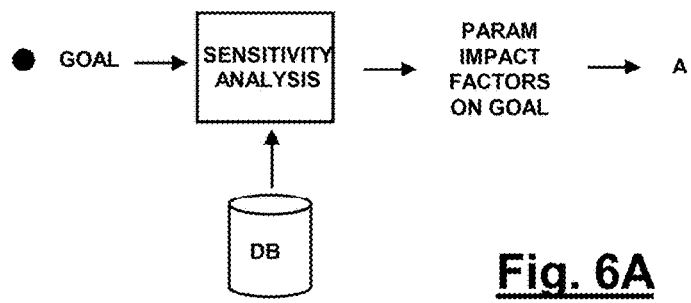
FIGS. 6A, 6B and 6C are flow diagrams representing the proposed method to select which parameters to optimize.

Goal-Guided Selection (FIG. 6A)

According to this strategy, the parameters which are known to mostly affect the goal of the optimization initiative are selected. This is done in three steps:
 a. Compute the Goal Over Historical Data Since the optimization goal (g) can be expressed with a performance metric (g=m) (e.g. throughput) or with a function of performance metrics (g=f(m1, m2, . . . )) (e.g. throughput/memory usage), the goal function of the current optimization initiative for all the past optimizations can be computed, if the past optimizations were conducted on IT systems where the metrics of interest were measured.
 b. Compute the Impact Factor for Each Parameter The impact of each parameter ($i_p$) on the user-defined goal is measured by analyzing historical data and performing a sensitivity analysis using standard statistical techniques. This information is used to extract knowledge from past optimizations and find parameters with a high impact on the current goal function.

For instance, a linear regression can be performed on historical data and then use the regression coefficients or use variance-based methodologies, which try to decompose the variance of the goal into parts attributable to the applied parameter.

Figure 7:
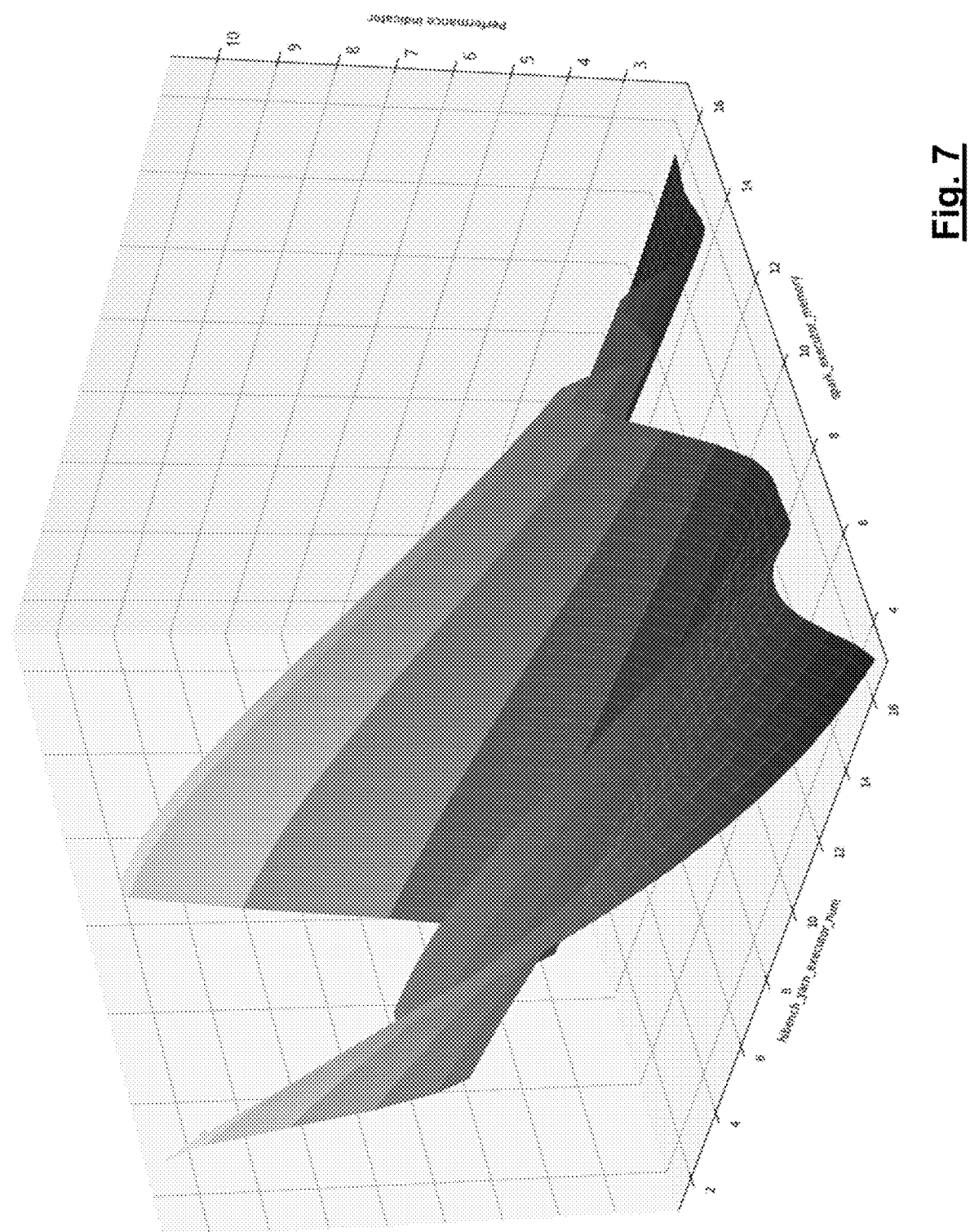
FIG. 7 is a 3D graph representing the conjunct effect of two parameters (spark_executor_memory and hibench_yarn_executor_num) on the performance indicator of an IT system.

As another example, partial dependence analysis can be used to derive the impact factor. Partial dependence is a standard statistical tool which is capable of predicting how the performance score will react to a certain parameter setting when all the other parameters are averaged out. Consider, for instance, in FIG. 7 the 3D plot of a performance indicator (which shall be minimized according to the example performance goal) of a SUT when varying two parameters. The computation of the partial dependencies leads to the result depicted in FIG. 8: the grey line (1) represents the partial dependence of the performance measure of the goal metric to the input parameters, the upper and lower black lines (3 and 4) indicate the maximum and minimum value of the partial dependence. The middle black line (2) will be used in the following sections.

As visible, the partial dependence curve mimics the behavior of the performance surface when projected onto a specific axis. In this case, the impact factor would be equal to the difference between the line of maximum and line of the minimum The first parameter would thus have an impact factor of 10.5−4.5=6 and the second one would be 9.5−7.5=2.

As said, any statistical technique for sensitivity analysis can be used in this step to measure the sensitivity of the goal metric to the parameter setting. This sensitivity score is then used as an impact factor for the parameter.

c. Add the most impactful parameters to the parameter set of the test configuration. The set of impactful parameters is then ordered by the impact factor ($i_p$) and the top K parameters, where K can be defined by the user, are added to the set of parameters to be used in the actual optimization step.

Performance-Guided Selection

Figure 6B:
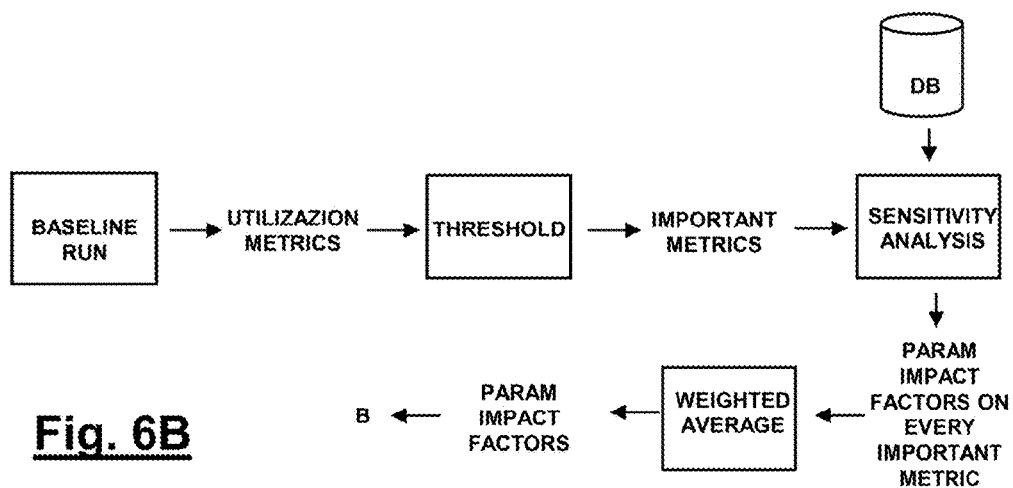

The detection of bottleneck-affecting parameters requires two steps: bottleneck resources identification and parameters selection. The process of the invention leverages profiling and tracing techniques to collect performance metrics, to identify what components might cause a bottleneck, e.g. HW (CPU, mem, network or disk) or SW (locking or other reasons for context switches). This is accomplished using a set of metrics that might measure resource utilization or saturation, which metrics are known per se and available in the field. The steps performed for this kind of selection are the following.

a. Compute the Set of Important Utilization Metrics (FIG. 6B).

During the initial baseline run, all utilization metrics (m) are collected from the system being optimized. Then, the utilization metrics whose value ($u_m$) is above a given threshold ($th_m$) are considered. The output of this step is a set of important utilization metrics (IM) which might indicate resource bottlenecks in the system.

$$IM: \{m: u_m > th_m\}$$

b. Identify the Parameter Impact Factor.

This information is then processed to define the impact factor of each parameter ($i_{m,p}$). The impact factor is calculated as explained in the previous section but using the important metric (m) instead of the goal function. A single impact factor is computed for every parameter by computing the weighted average over all the metrics using the difference between the observed value and the metric threshold ($u_m - th_m$) as weight as shown in the following formula.

$$\forall p \in IM \ \ i_p = \frac{\sum_m i_{m,p} * (u_m - th_m)}{\sum_m (u_m - th_m)}$$

In this way, it is determined that a parameter is very impactful when the parameter has a great impact on many metrics which are considerably above their thresholds.

c. Add the Identified Impactful Parameters.

The set of impactful parameters is then ordered by the impact factor ($i_p$) and the top K parameters, where K can be defined by the user, are added to the set of parameters to be used in the actual optimization process.

Figure 6C:
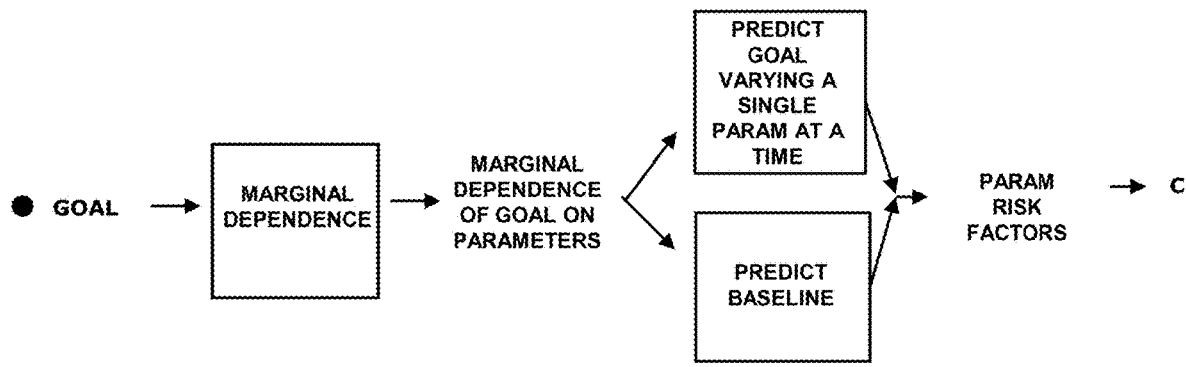

Risk-Averse Selection (FIG. 6C)

The method can also avoid including parameters which may lead to bad performing systems. These parameters are called risky and they can be identified by looking at the result of past performance tests. Again, this process is divided into 3 steps.

a. Compute Marginal Goal Dependency on the Parameters

Similarly, to what explained in the Goal-guided selection strategy, the method starts by computing the defined goal function (g) over all available experiments in the knowledge base. Then, the marginal dependencies (as explained above) are computed to predict which will be the goal value when a certain parameter is set to a specific value (g=f(p)).

b. Calculate the Parameter Risk Factor.

Since the method always starts the optimization process from the baseline configuration (p), this information can be used together with the predictions coming from the marginal dependence analysis, to predict if a certain parameter setting will result in degraded or improved performance with respect to the baseline, whose value is known (g).

Accordingly, a risky parameter is defined as one which, on historical data, was observed to have a great negative impact on the performance goal. More specifically, the risk factor ($r_p$) is calculated as the minimum performance score predicted by the marginal dependence over all possible configuration values, divided by the baseline (when the goal of the optimization initiative is the maximization of the desired performance indicator g such as a throughput):

$$r_p = \min(g)/g \text{ if maximizing } g$$

As an alternative, the risk factor is calculated as the maximum performance score predicted by the marginal dependence over all possible configuration values, divided by the baseline (when the goal is toward minimization):

$$r_p = \max(g)/g \text{ if minimizing } g$$

For example, if the purpose is to minimize the response time, we consider the maximum value (i.e., the worst value) of the partial dependence, obtaining 10.5 for the first parameter and 9.5 for the second one (upper black line and point 3). Then such parameter values are divided by the baseline goal score (middle black line and point 2) obtaining a risk factor of 1.4 for the first parameter and 1.27 for the second one; this means that, in the worst case, it is expected that the first parameter would increase the response time up to 40% and the second one only up to 27%.

It should be noted that a parameter which severely impacts the SUT behavior, and thus strongly affects the performance indicator g, is considered a risky one only when it can affect the performance in a negative way. Suppose, in fact, that it is desired again to minimize the response time of a database which is heavily affected by a specific parameter (e.g. database cache size). Then, this parameter will have a high impact factor (as explained in the previous section), but its risk factor will not be necessarily high. The risk factor, in fact, will be high only if there exist settings for this parameter resulting in higher response times with respect to the baseline one obtained with the default configuration.

A parameter is thus considered risky if it was observed to have a great impact on the performance score (as such, it would have been included by the goal-related policy), but it also had some settings which resulted in extremely degraded performance. As an example, database cache size parameters usually have a great impact on performance but setting them too low would cause the IT system to perform very badly in terms of response time and throughput, leading to bad values of the performance indicator: accordingly, cache setting parameters would be suggested as risky by this strategy.

Figure 8A:
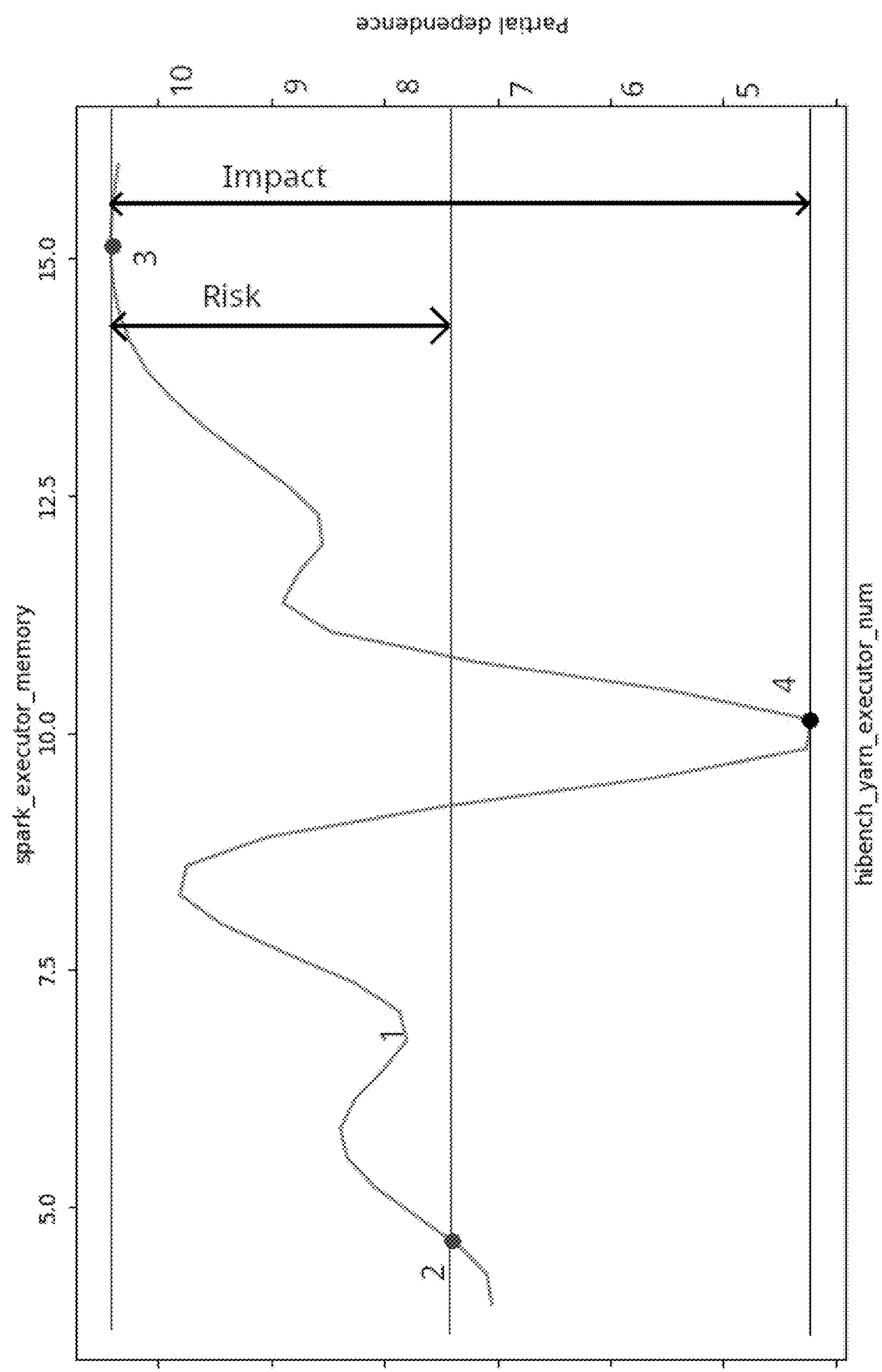
FIGS. 8A and 8B are diagram views representing two graphs where the contributions of each parameter of FIG. 7 have been respectively splitted.
Figure 8B:
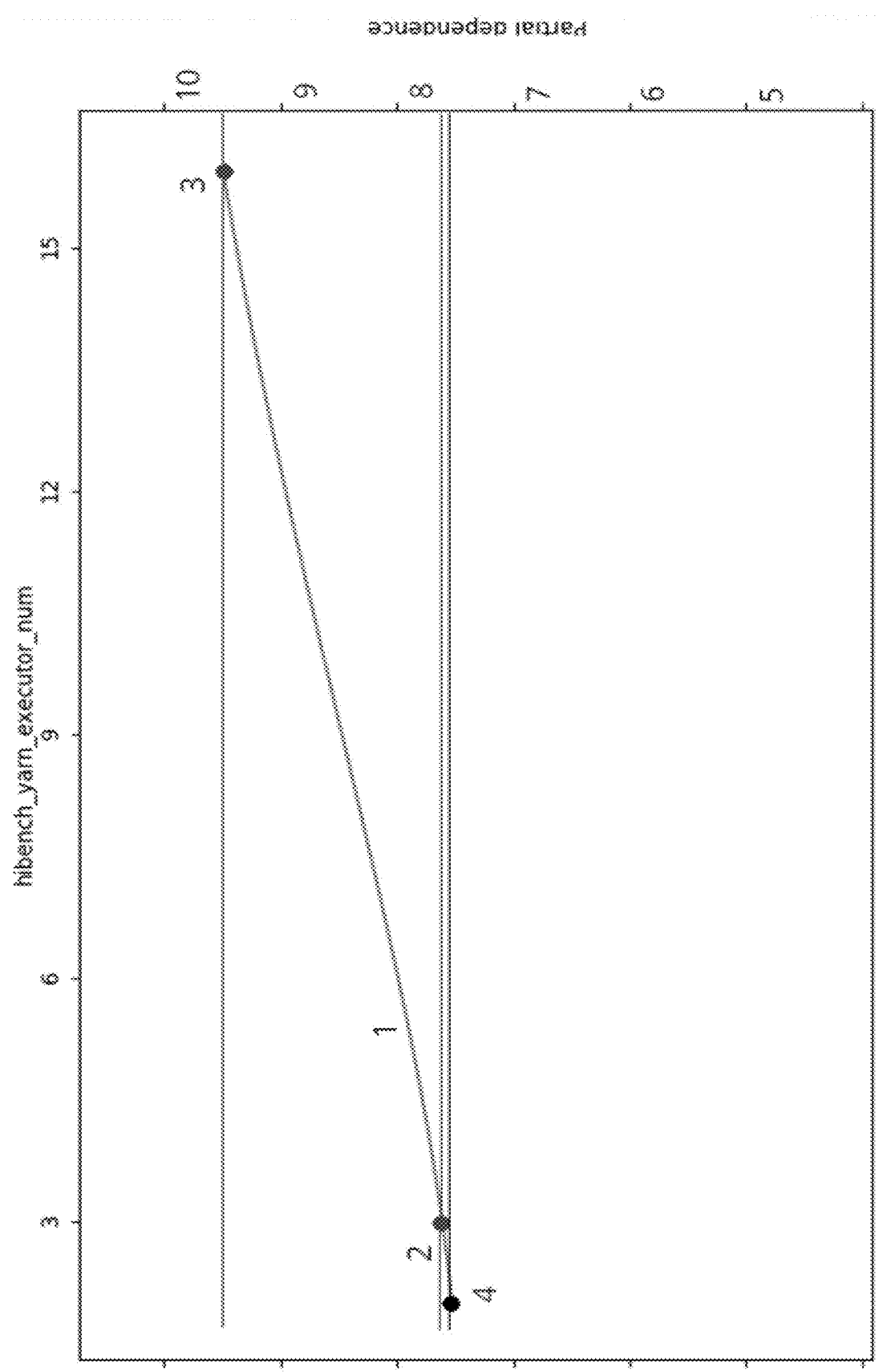

Going back to FIG. 8, the points labeled as 2 show the baseline configuration of each parameter, and the corresponding line indicates the value of the partial dependence. Differently, from the computation of the impact factor (which is the difference between the maximum achievable performance (point 3) and the minimum one (point 4)), the risk factor is equal to the difference between the minimum performance (point 4) and the baseline performance (point 2).

c. Remove the Identified Risky Parameters.

The identified risky parameters are removed from the set of parameters to be used in the generation of the candidate configuration. This is done comparing the risk score of each parameter with respect to a risk threshold RT defined by the user—which represents the risk that the user is willing to accept—and discarding all the parameters having a risk score higher than said risk threshold RT.

In the example above, a risk threshold of 1.3 would cause the process to remove the first parameter, which is indeed the riskier one.

3. Configuration Suggestion through Machine Learning (ML) Model

The core of the configuration suggestion process is an implementation of a Bayesian Optimizer with Gaussian Processes. In particular, a sequential model-based Bayesian optimization (SMBO) has been chosen. SMBO is a state-of-the-art method for the optimization of costly functions. According to the invention, an additional method is built and expanded on it to obtain innovative capabilities. In this section, it is briefly described how SMBO works, so that it will be easier to understand the extensions of the invention, explained in other sections. A more detailed description of SMBO can be found in Shahriari, Bobak, et al. "Taking the human out of the loop: A review of Bayesian optimization." *Proceedings of the IEEE* 104.1 (2016): 148-175.

The method provides to create a model—a so-called surrogate model—to estimate the performance behavior of the System Under Test (SUT) when certain configurations are applied. This surrogate model is then used to select promising points, amongst all possible configurations, to be tested on the SUT. When the actual value of the selected configuration has been evaluated via performance test of the SUT, the model can be updated accordingly and then used to select a new configuration in an iterative way.

Consider that in the specification with the terms "points" it is meant a point in the 'search space', i.e. a specific configuration including a number of selected values for the adjustable parameters of the configuration; accordingly, "points", "configurations" and "parameter vectors" are used as synonyms.

As a surrogate model, Gaussian processes (GP) are used, due to their ability to yield accurate estimates of the expected value, along with an uncertainty estimate, at any given input. GPs are the standard choice for SMBO, and a more detailed description can be found in Rasmussen, Carl Edward. "Gaussian processes in machine learning." *Advanced lectures on machine learning*. Springer, Berlin, Heidelberg, 2004. 63-71.

The use of GPs as surrogate models enables to derive a trade-off between exploration of uncertain regions of the parameters space and exploitation of promising regions. In fact, in order to choose the next point to be evaluated, the optimizer module 101 operates on an Acquisition Function (AF) which takes into account both the expected value of possible configurations, which represents the prediction of the value of the performance indicator according to the model, and its uncertainty generated by evaluating the GP. In such a way, a point (representing a desired set of parameters) can be selected either because it is expected to give really good results (exploitation) or because it has a high uncertainty (exploration) and might lead to discovering unexpected good regions of the search space.

An example of an AF, which can be used when the goal to minimize a performance score (e.g. database response time or server CPU utilization) is the 'lower confidence bound' (LCB), which is computed as the difference between the predicted value and the prediction uncertainty. In this way, the algorithm will choose configurations with low predicted value (in this case low response time or CPU utilization) or a big uncertainty. By carefully controlling this trade-off, the unknown objective function can be optimized with a relatively low number of trials and time consumption.

Figure 9A:
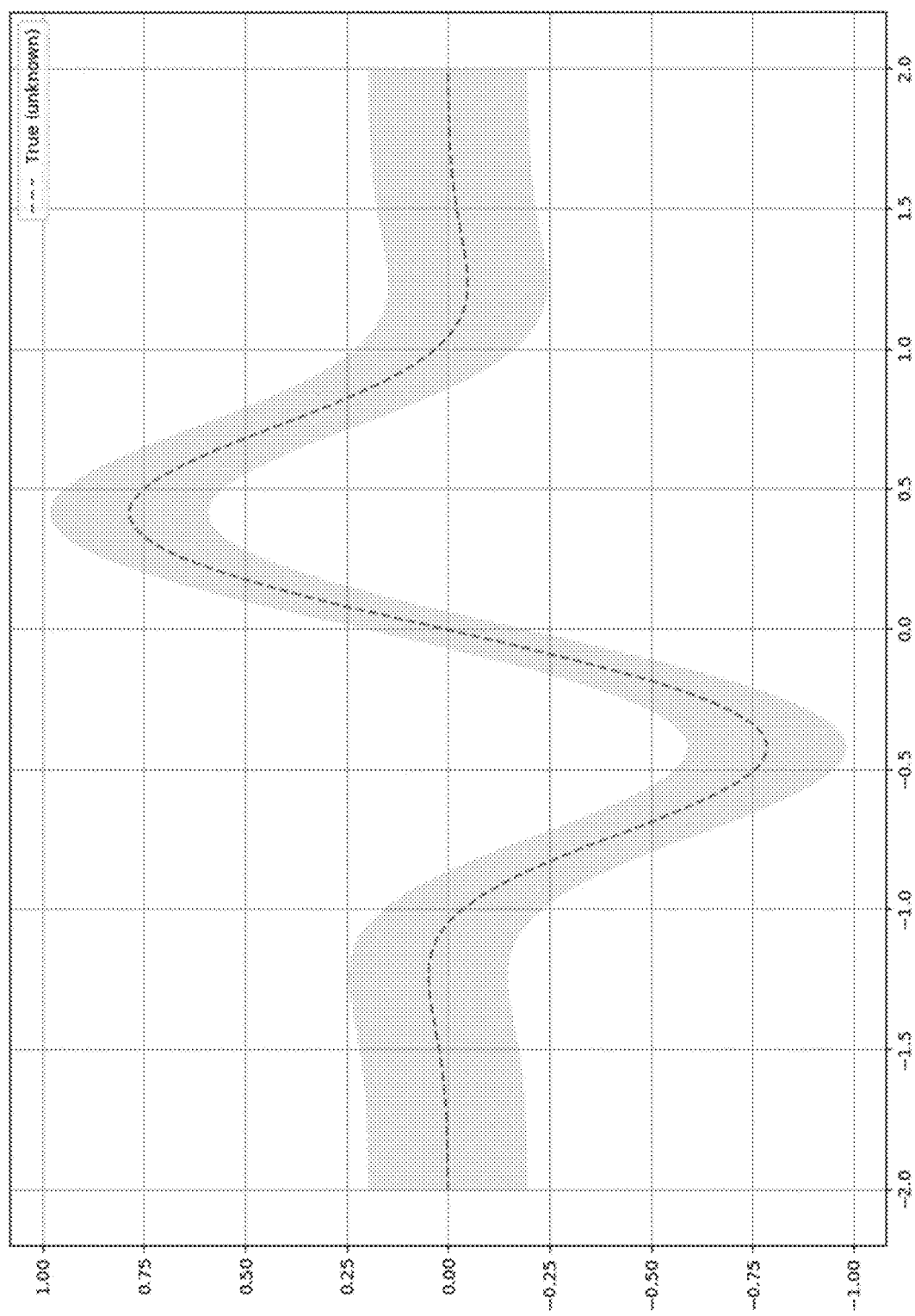
FIG. 9A is an exemplifying graph representing how a certain performance indicator reacts to a certain parameter, i.e. it represents the real function connecting the parameter to the performance indicator.

Considering the plot depicted in FIG. 9A, the x-axis represents a hypothetical candidate configuration for a single parameter (e.g. database cache size) and the y-axis represents the performance score obtained from the IT system when said candidate configuration is applied (e.g. Response Time). The dashed line is a function representing the SUT performance when a specific parameter value is applied, which is not known beforehand. As previously said, IT system performance measurements are subject to noise (e.g. due to inaccurate measurements or infrastructure/environment variability). In FIG. 9A, the grey area represents this uncertainty. The objective of the invention is to find the value of the parameter which minimizes (or maximizes) the function. It is possible to obtain a point-wise, noisy, evaluation of the function (e.g. database response time) by running a performance test of the SUT with a specific parameter value (e.g. database cache size=1 G).

Figure 9B:
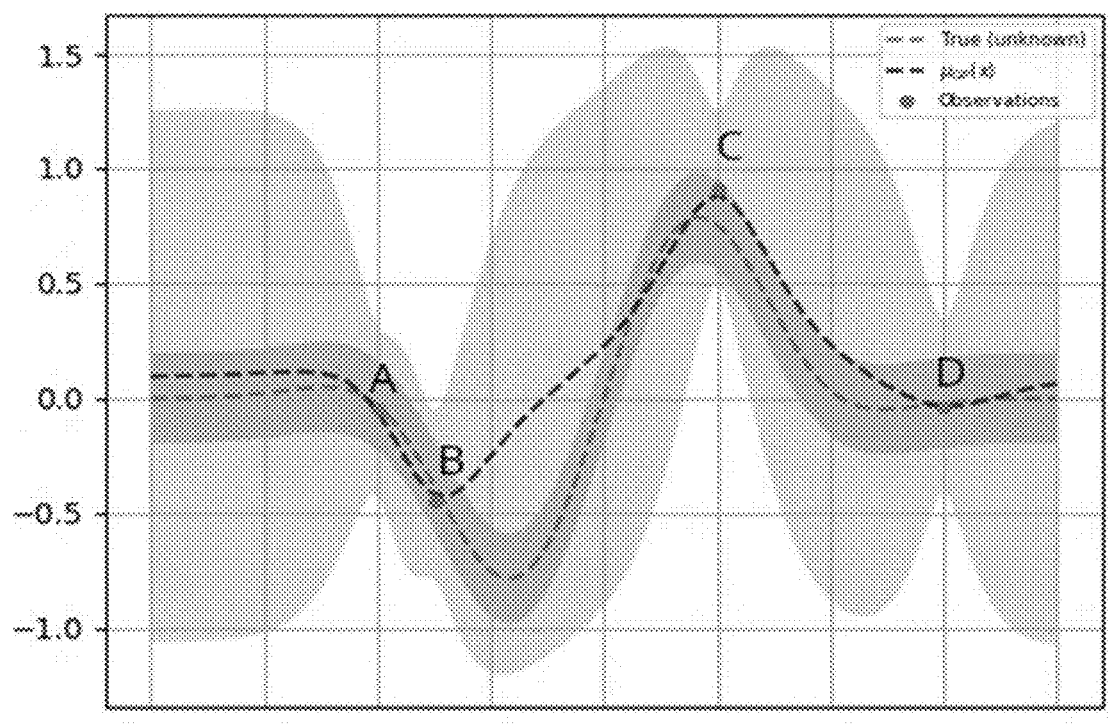
FIGS. 9B-9E are graphs representing the various steps of how Sequential Model-based Bayesian Optimization (SMBO) proceeds to find the minimum of the function represented in FIG. 9.

Let's assume that the goal is to minimize this performance indicator (in our example the database response time). The optimization process (see FIGS. 9B-9E) starts by sampling some initial configurations (points A, B, C, and D) and evaluating them on the real system in order to obtain the correspondent value of the performance score. Then, a model is built leveraging sampled data. Such model provides an estimate of the underlying SUT performance function and can be used to predict the performance under different parameter configurations and the related uncertainty. FIG. 9B shows the real SUT performance function and noise from FIG. 9A along with the sampled configurations (points A-D), the performance predicted by the model (the dark grey line passing through points A-D) and the predicted noise (light grey area).

Figure 9C:
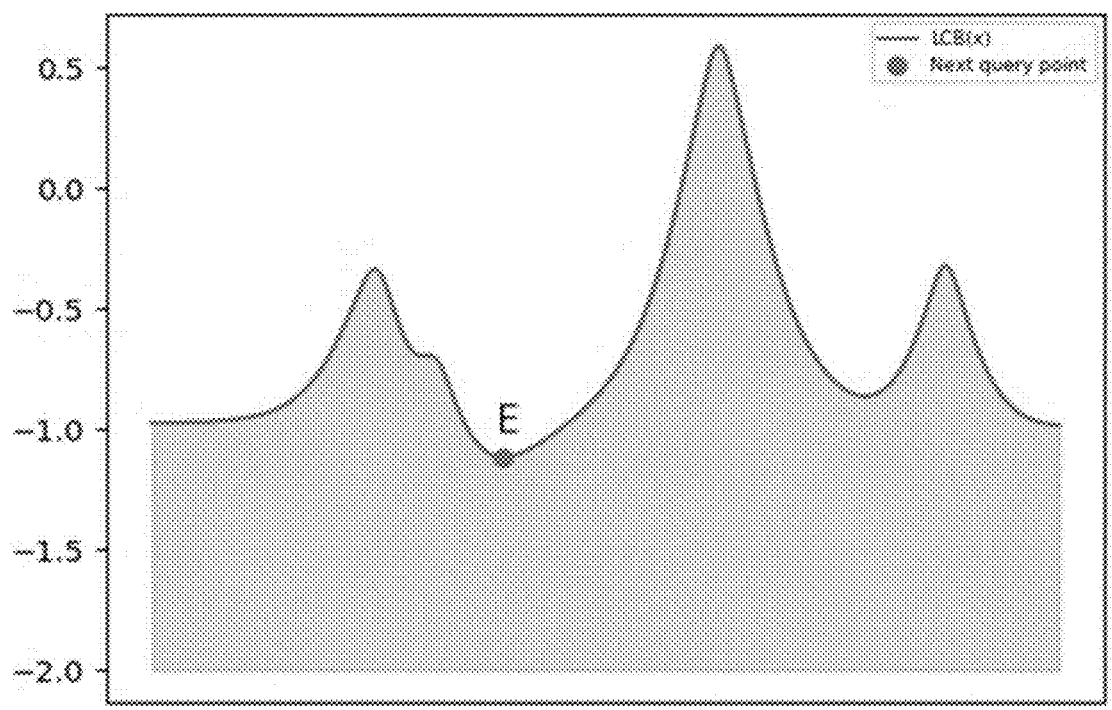
Figure 9D:
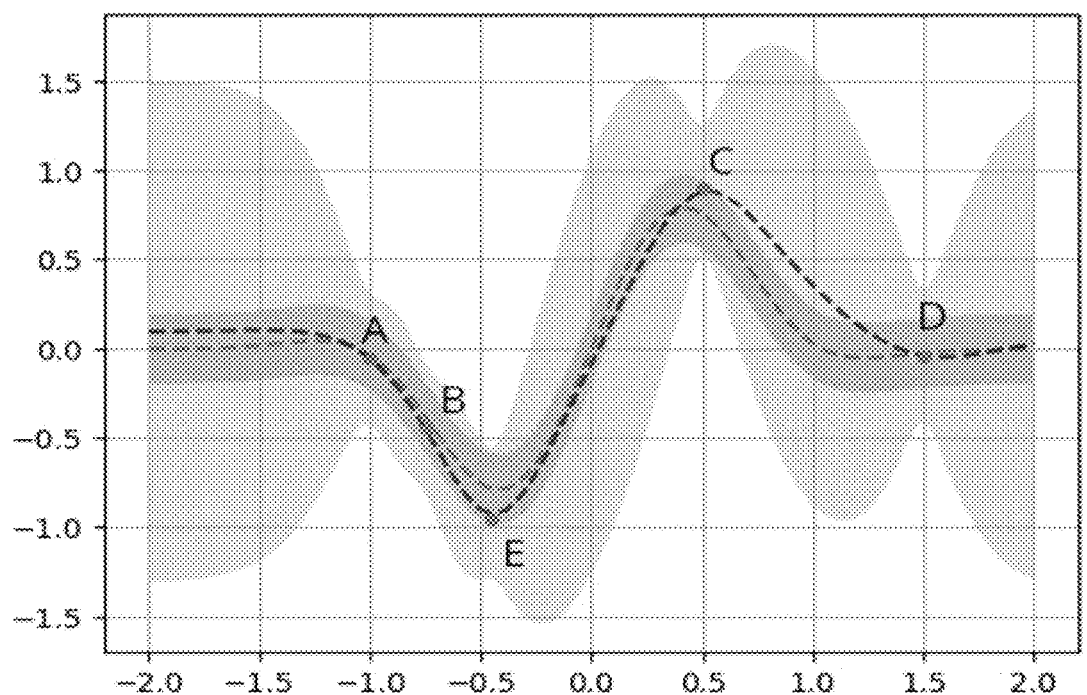
Figure 9E:
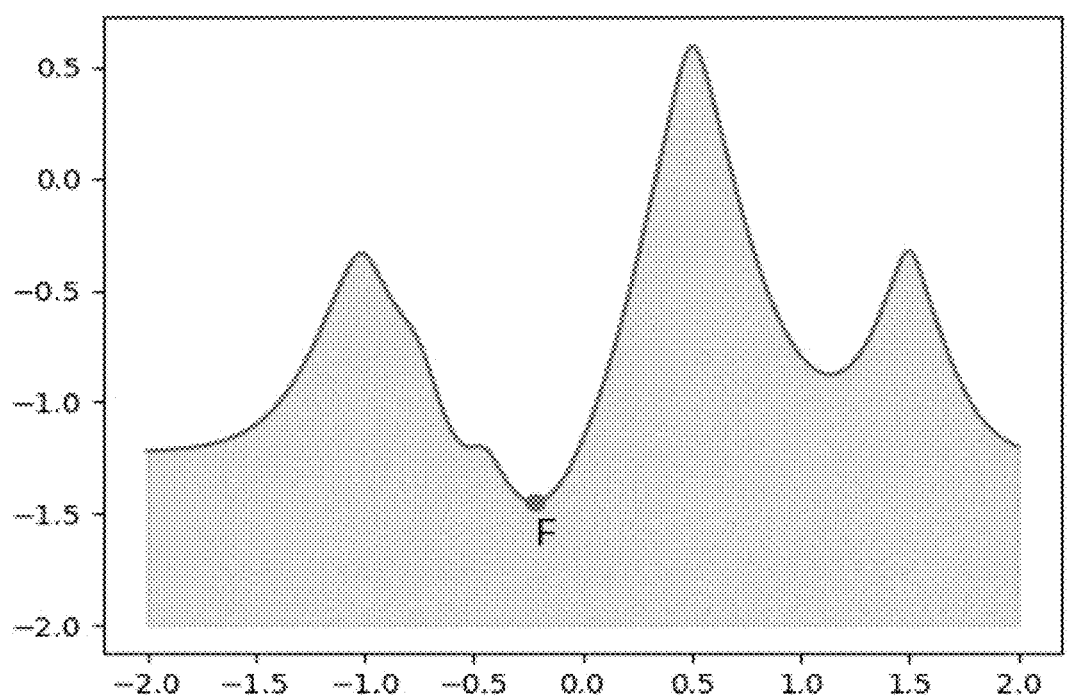

These output of the model, i.e. predicted 'performance value' and predicted 'uncertainty', are then combined to obtain the AF (line in FIG. 9C), which is then minimized to select the next candidate configuration to be tested (point E in FIG. 9C). Since the AF of the example is LCB, it matches the lower boundary of the light grey area representing uncertainty in FIG. 9B. The candidate configuration to be tested, defined by point E in FIGS. 9C and 9D, is then evaluated on the real system and the model is updated (FIG. 9D). The AF of the updated model (FIG. 9E) is computed and the optimization process loops again.

By using this optimization framework, the method of the invention is able to:
- predict the performance of a candidate configuration (the dark dashed line passing through the points A-E in FIG.9D);
- estimate the uncertainty over the prediction (light grey area in FIGS. 9B and 9D);
- select the next candidate configuration to be evaluated (points E and F of FIGS. 9C and 9E) by means of an AF (line in FIGS. 9C, 9E), trading-off of exploration and exploitation;

The combination of performance prediction and uncertainty estimation allows the method to properly accommodate also noise reduction, safety constraints and workload design steps in the optimization loop, as explained later in the description.

Moreover, a Gaussian process (GP) directly offers a marginal likelihood measure, a quantity which represents the likelihood that the observed data has been generated by the model itself. This quantity can be used to measure the goodness of a Gaussian process and is useful in the noise reduction step.

4. Outlier Detection

When optimizing real IT systems, the ability to understand if a small improvement is due to an actually better configuration or simply to the underlying noise is of paramount importance. Such noise can arise from the infrastructure, external workloads, noisy neighbors on cloud systems, network congestion, etc.

In performance testing practice, the result of a test is considered noisy if, repeating the test with the same conditions of the system the results change in a significant way.

Two types of noise can be identified: zero-mean (Gaussian) noise and Poissonian noise. Zero-mean noises are the typical measurement errors and benchmark variabilities: their effect can be reduced with multiple and more accurate measurements and standard Gaussian processes can take them into consideration, as described in the above section.

However, there are other kinds of noises which, if not handled, could severely affect the optimization method. As an example, a backup job which is scheduled to run every night on the IT system can have an adverse effect on the average performance of the system. If the optimization method doesn't take it into account, a performance test with a test configuration can be run by chance while the backup is running: the test is likely to obtain a really bad score, since the IT system is busy doing the backup and has a temporary lack of resources to properly handle the workload of the performance test. If not removed, the result of this test would be fed to the ML module and severely impact the accuracy of the model. Suppose in fact that the selected configuration was a particularly good one (e.g. one that leads to very low database response time), but the performance test shows a very high response time because of a database batch job that was running on the same infrastructure. These points (configurations) are defined outliers since their performance score is totally wrong due to a rarely occurring event in the IT system.

As an example, consider the optimization process reported in FIGS. 10A-D, which is similar to the one described in the previous section.

Figure 10A:
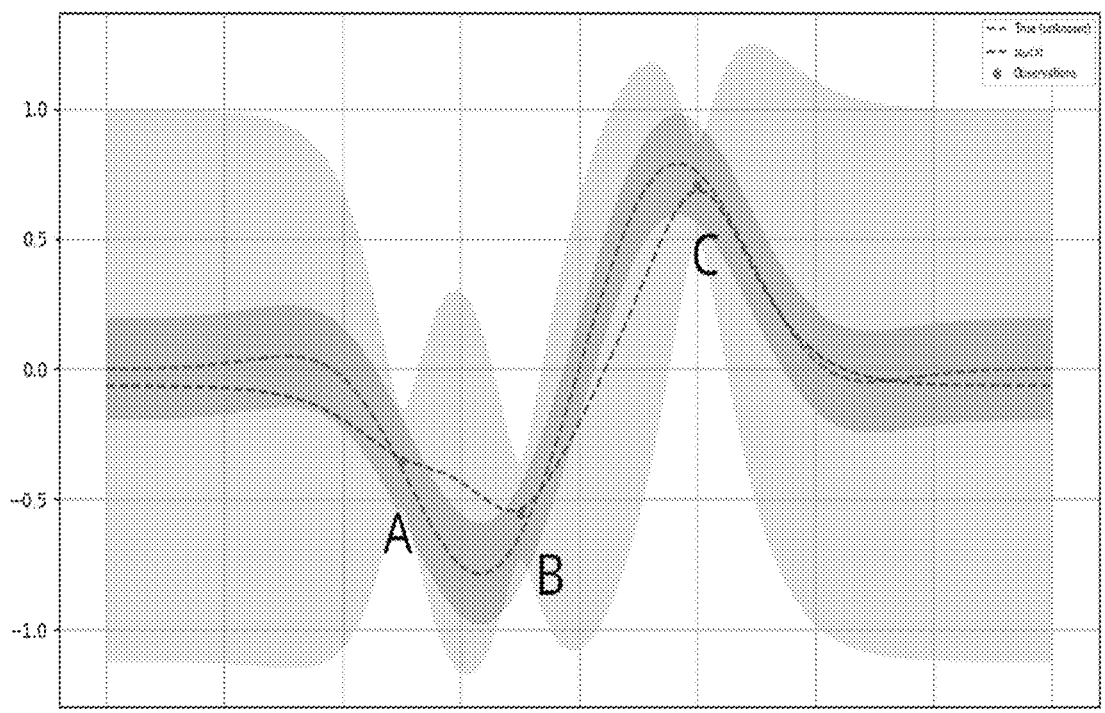
FIGS. 10A-10D are graphs representing the effect of outliers (extremely noisy measurements) on the optimization process.
Figure 10B:
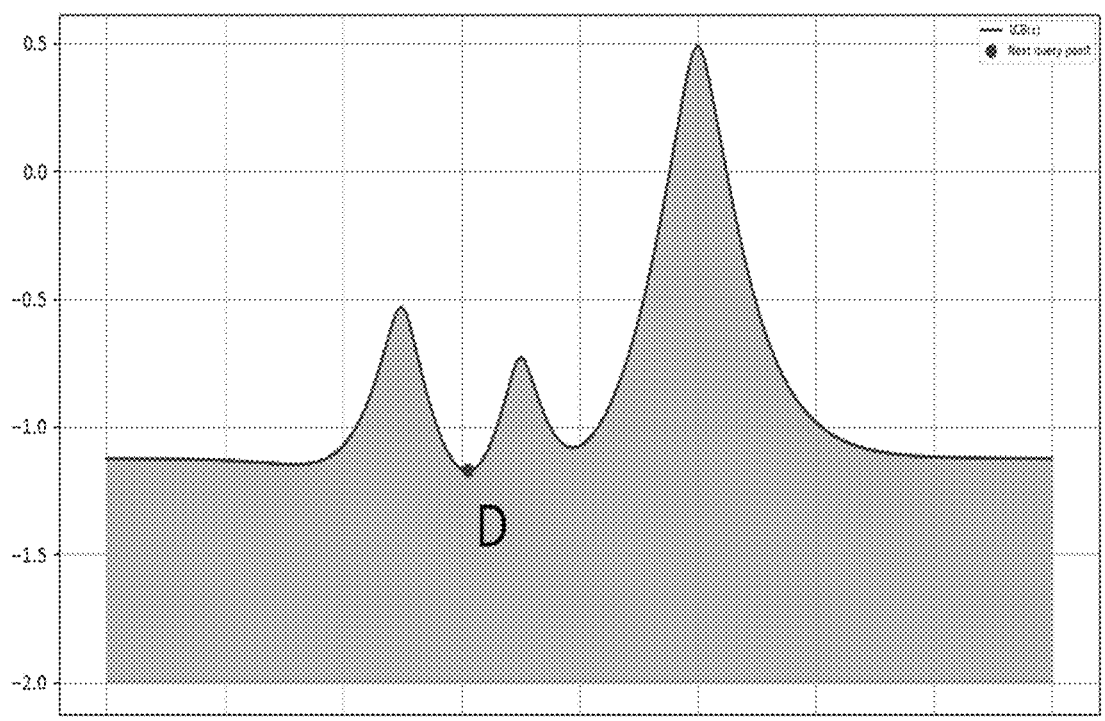

The optimization starts from three points already evaluated (points A, B, C in FIG. 10A). They are already sufficient to obtain a very good model, as the dark dashed line (representing the model prediction) matches the light one (representing the real, unknown, function) in nearly all the domain, and to select (FIG. 10B)—as explained above—the next point (point D), which is evaluated and used to update the model.

Suppose that point D (which is very close to global optimum) is evaluated in an extremely noisy environment, resulting in an extremely high value. This leads the model prediction to the situation depicted in FIG. 10C, where the model predictions are really different from the real function, making it unusable for accurately predicting the actual performance of a test configuration (the dark dashed line passing through all the points A-D is totally different from the light dashed line in FIG. 10C).

Figure 10C:
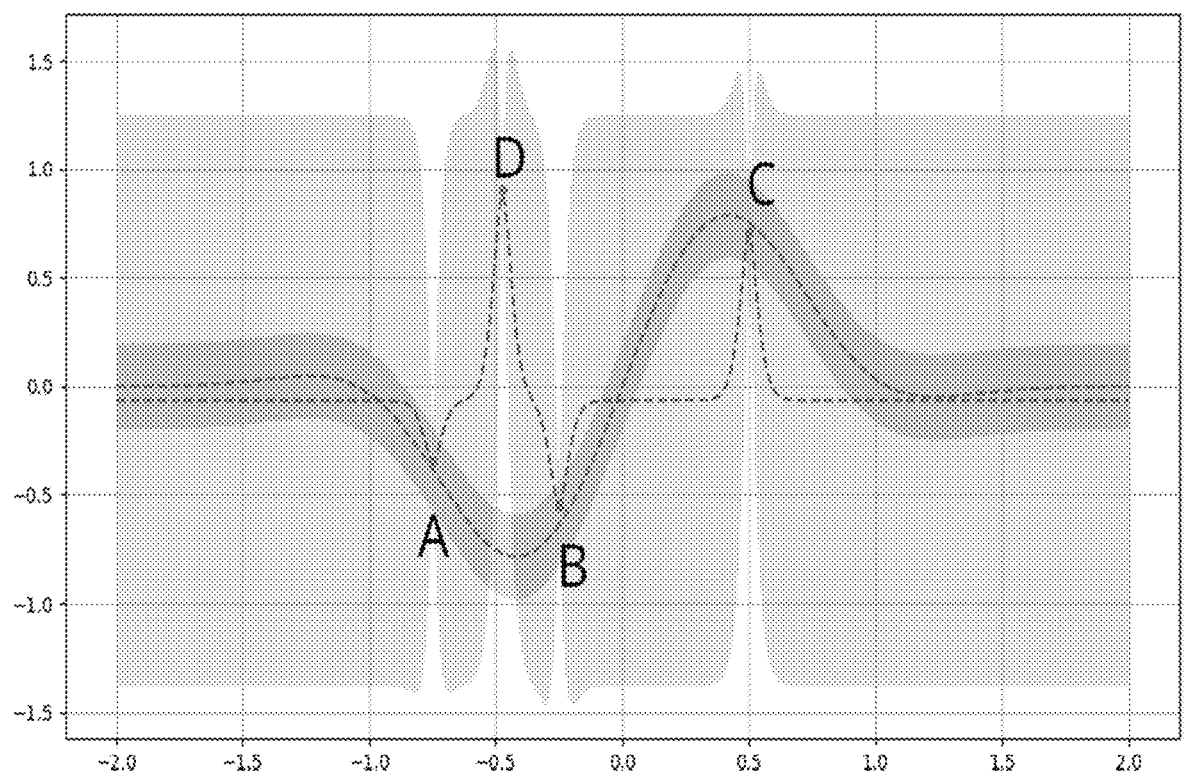
Figure 10D:
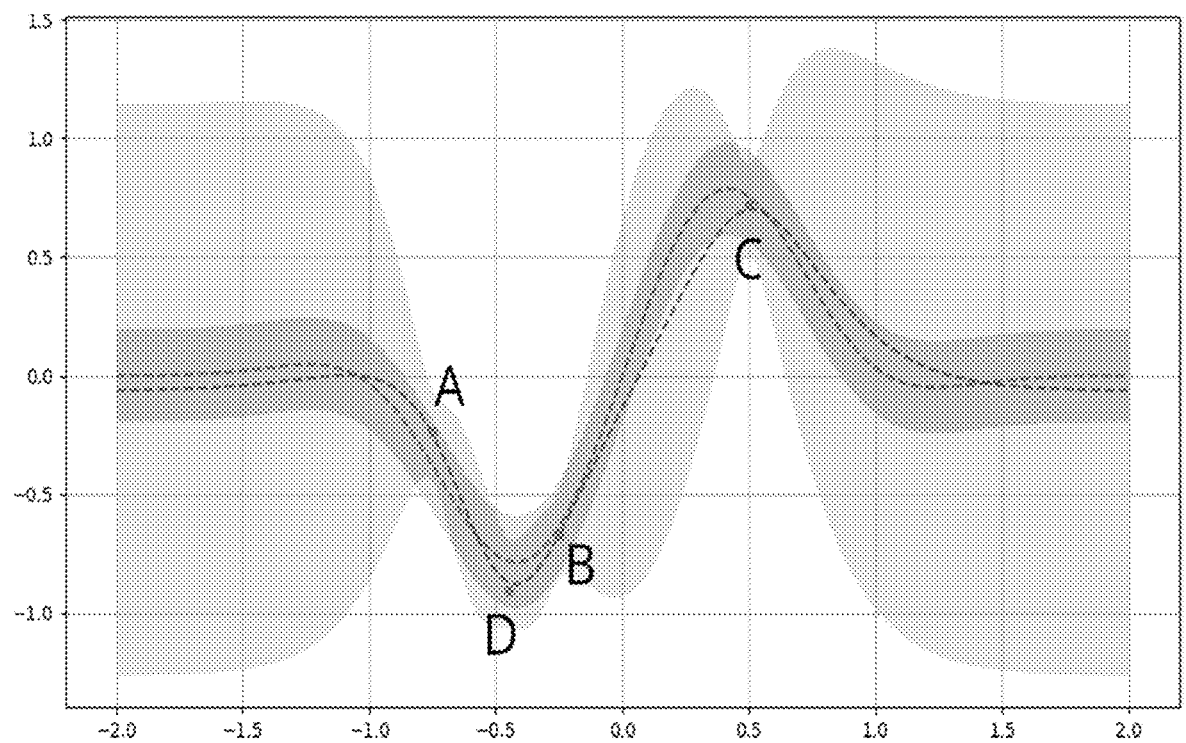

Compare FIG. 10C with FIG. 10D, where it is supposed that point D is evaluated without incurring in a noisy behavior. The two dashed lines are now very similar, allowing to make very good predictions about the performance of a test configuration, which was not possible to do with the outlier measurement.

To reduce the impact of outlier measurements, the method of the invention provides to exploit the capabilities of a Gaussian Process to give an estimate of its goodness via a likelihood quantity. A likelihood quantity measures the probability that the observed data has been generated by the model. If removing a point from a Gaussian Process leads to an increased likelihood, the remaining data are much easier to explain within the model: therefore, it can be concluded that the removed point can be very hardly explained within the model when considering all the other points. Therefore, it can be considered that such a point is a noisy outlier and it shall be removed from the Gaussian process, which is free to evaluate that configuration again if useful.

Figure 11:
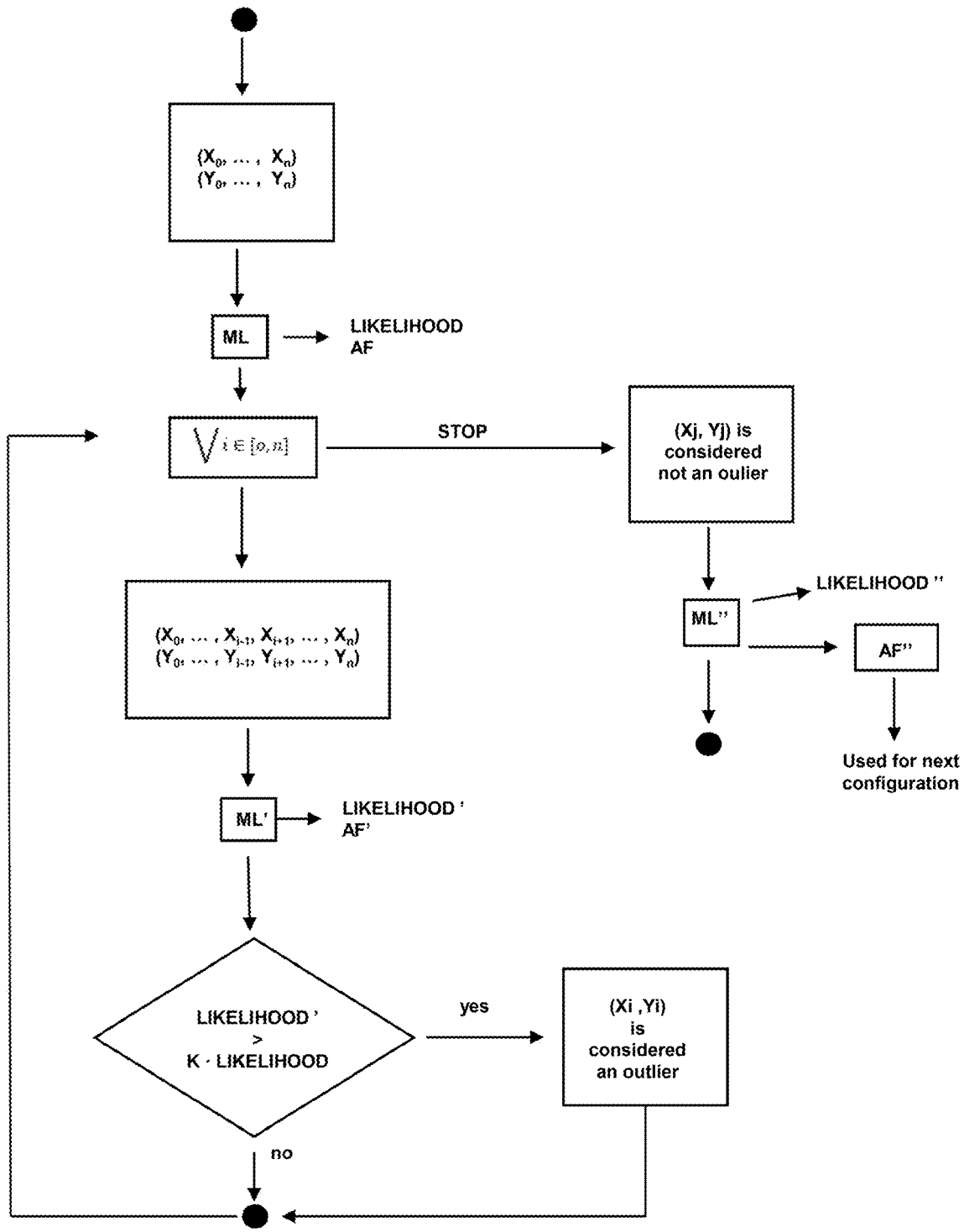
FIG. 11 is a flow diagram representing the proposed method of the invention to make SMBO resilient to outliers.

As the optimization process proceeds, the method (see FIG. 11) use the ML model to check whether results of past performance tests are likely to be noisy outliers. To do so, the method removes every configuration point (one by one) and fit a new ML model with the remaining ones. Suppose that N configurations were evaluated, then the method creates a model with all the N points and saves its likelihood. Then, for every single point among the N available ones, a new model is created without considering that point but considering the remaining N−1 ones. If the new model has a higher likelihood quantity that the original one, the removed point is considered a noisy one. After having considered all the points, a final Gaussian Process GP is created using only the points not identified as noisy outliers and said GP is used to select the next configuration to be tested.

5. Safety Filtering

In the context of adjustable parameter configurations, safety means avoid testing excessively bad configurations. Indeed, for example, if the tuning method shall be applied directly to production deployments of IT systems, it is critical to avoid impacting on end-user's experience by testing configurations resulting in very slow performance. For this reason, selecting only configurations that are expected to provide at least acceptable performance level is a key feature.

Exploiting the GP, the ML module, as explained above, can predict beforehand the expected performance value of a configuration and the associated prediction uncertainty. So, if a certain configuration is predicted to lead to poor performance with high confidence, the method avoids testing it on the SUT. However, there may be configurations with a good expected performance but a very high uncertainty. In such situations, the configuration is expected to be well-performing, but it may result in degraded performance as well.

The method can thus follow a more conservative exploration of the search space, where it refuses to evaluate configurations with a too high level of uncertainty of the predicted performance. Accordingly, the method starts by testing all the sane and reliable configurations, such as the default one (already used in production), the one suggested by vendors or configurations suggested by a human expert. Then, the method proceeds using the optimization process with a constraint on the uncertainty of the solution, meaning that the process is allowed to test configurations with a low variance on the underlying ML model. This results in an optimization that proceeds in small steps.

In this way, the method avoids testing risky configurations and only test configurations that are less likely to cause severe performance degradation. The extent to which this behavior is pursued can be defined by the user, by acting on an adjustable uncertainty threshold.

To obtain this feature, the AF is modified in regions where the prediction uncertainty is above an uncertainty threshold. If the method is using an AF which needs to be minimized (such as LCB described in the previous section), the AF is set to plus infinity when the uncertainty is above a certain value, whereas it is set to zero when using AFs that need to be maximized (such as Upper Confidence Bound).

As an example, the formula for the computation of LCB (used for minimization) becomes:

$$LCB(X)=E(f(X))-\sigma^2(f(X)) \text{ if } \sigma^2<\text{threshold}, +inf \text{ otherwise}$$

where E(f(X)) is the expected value of the objective function (the estimate provided by the surrogate model of the ML module) and σ is the uncertainty over that prediction.

As explained in the previous sections, the method then proceeds by minimizing the acquisition function and selecting the corresponding configuration. By all means, setting the AF to an infinite value (in the case of minimization, or to 0 in case of minimization) drives the ML module to avoid evaluating those regions that are considered unsafe.

The selected configuration is then used to drive the performance test and used as input for successive steps of the optimization method as explained in previous sections.

Figure 12A:
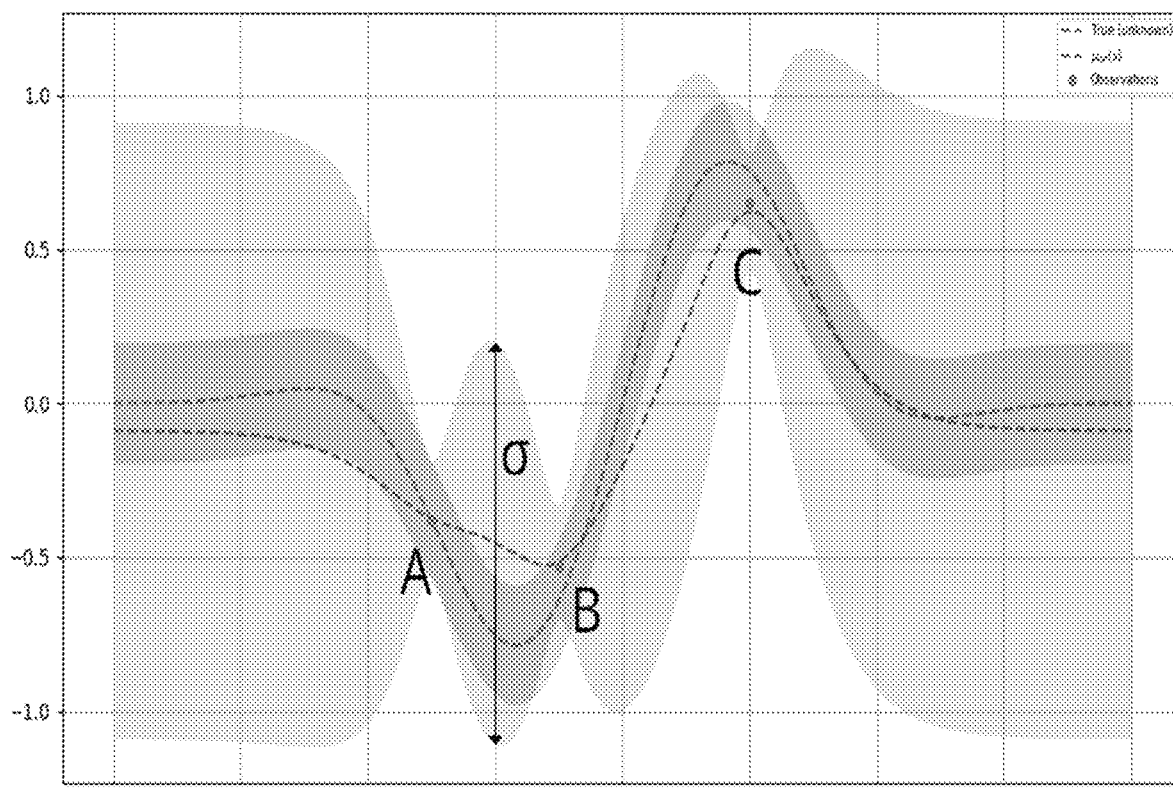
FIG. 12A-C are comparative graphs representing how the Acquisition Function (AF) of the SMBO approach is modified by the proposed safety filtering.
Figure 12B:
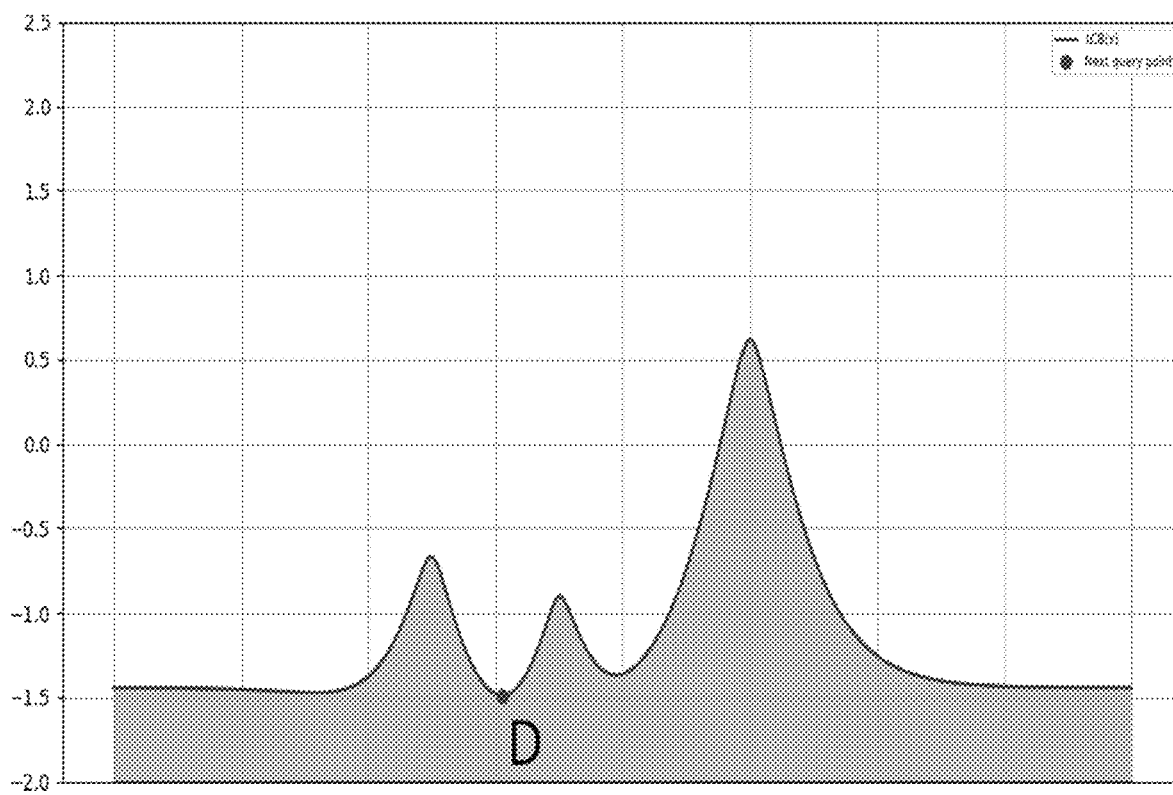

As an example, consider the situation depicted in FIG. 12A, where three configurations (A, B and C) have been evaluated. By using the SMBO approach described above, the solution of the method suggests that the point D in FIG. 12B is the next configuration to be tested. However, the uncertainty of the GP (σ in FIG. 12A) about the expected performance value of this configuration is very high.

Figure 12C:
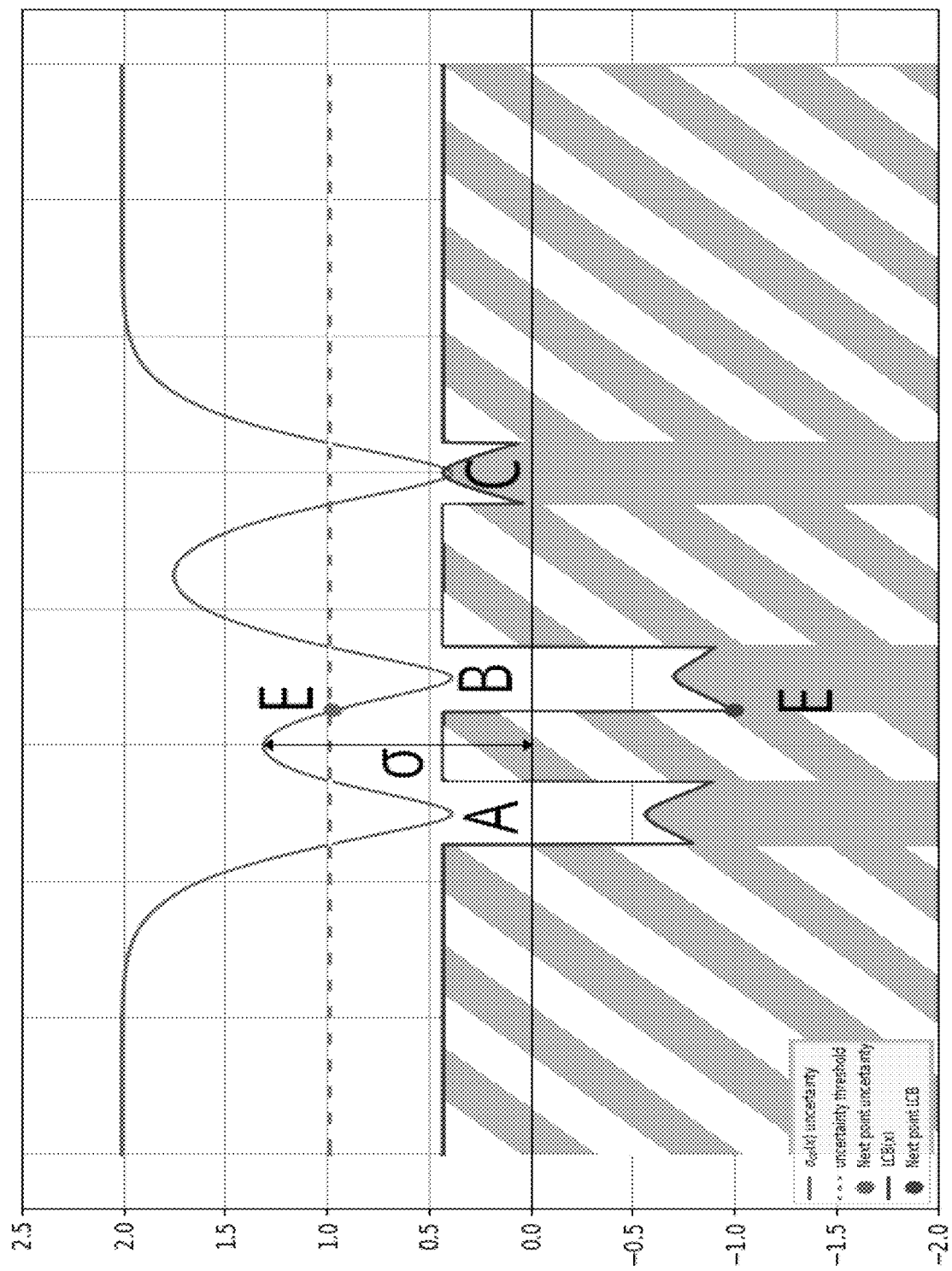

Therefore, in FIG. 12C it is exploited the safety filtering approach described above. The upper line represents the uncertainty of the GP, with σ having the same value it had in FIG. 12A. The points A, B, and C represent the tested configurations, and the uncertainty in those points is close to zero, as we expected. The dashed line represents our uncertainty threshold, which is the maximum value of uncertainty we can accept. Therefore, we will refuse to evaluate any configuration with an associated uncertainty above this dashed line.

To obtain this, the AF of FIG. 12B is modified into the one shown in FIG. 12C (black line above the striped area denoted as "LCB(x)"). As explained above, AF is put to infinity in the points with uncertainty above the threshold. In the graph, infinity is represented with a striped area. After this step, SMBO will no longer select configuration D, which has a high uncertainty and an infinite AF, but it will select configuration E, about whose performance the GP is more confident.

6. Workload Design

In many situations, users wish that the tuning method acts on the SUT toward maximization of a certain metric or function (such as the system throughput). In the remainder of this section, for sake of simplicity, it will be made reference to an example regarding throughput maximization, but the same principles apply for any maximization or minimization of any other goal function.

Figure 13B:
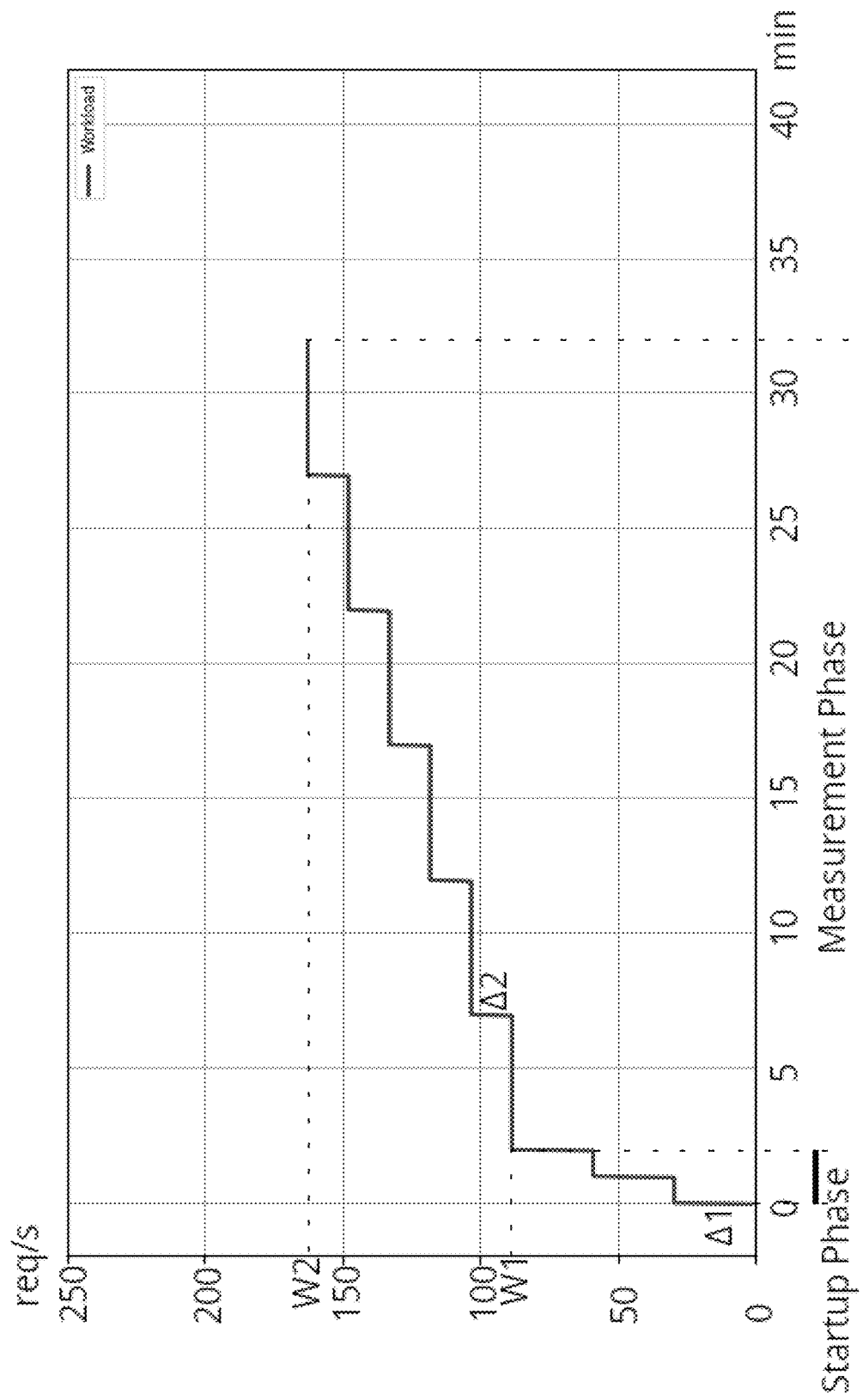
FIGS. 13B-13C are graphs representing how a modified workload that makes use of the estimation of the performance indicator (in this case a throughput) provided by the GP is built.
Figure 13C:
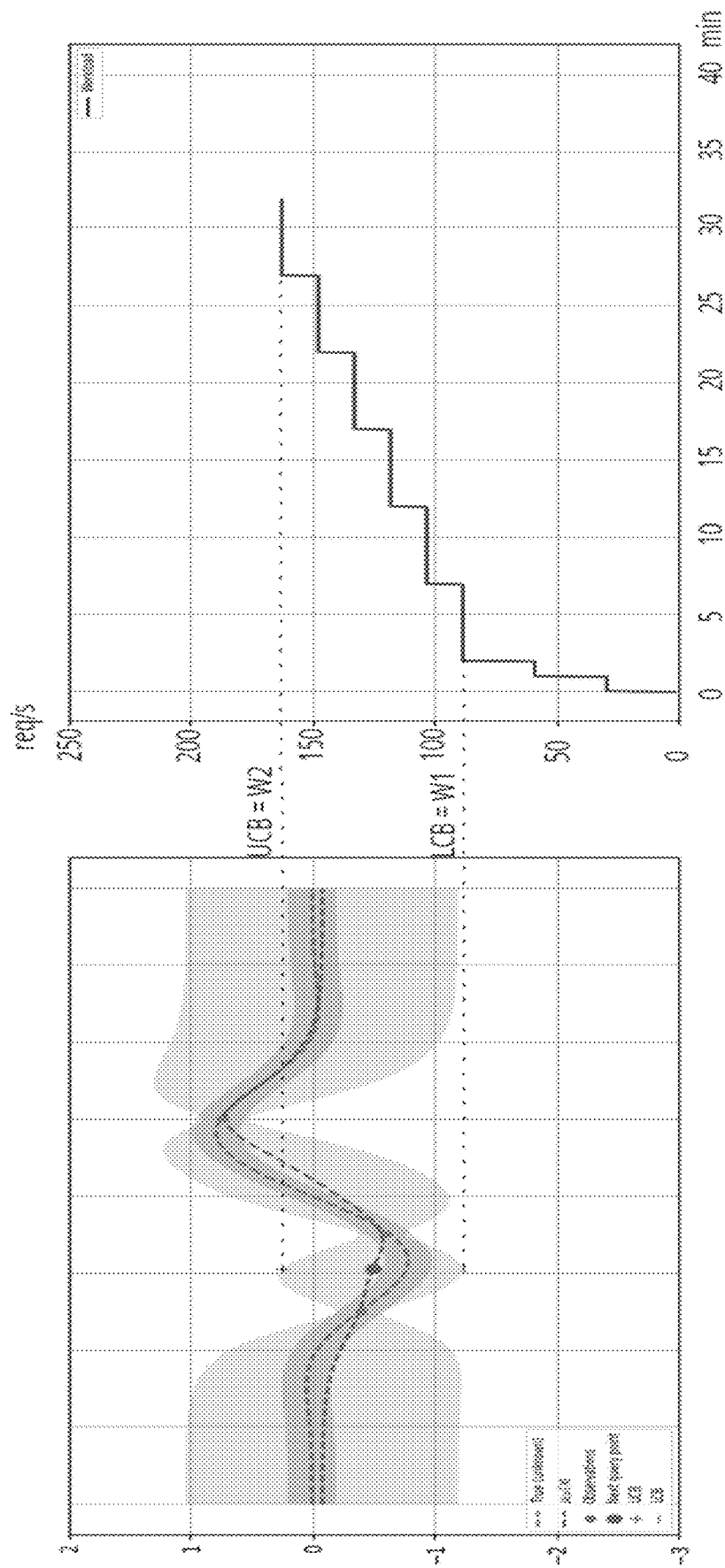
Figure 13A:
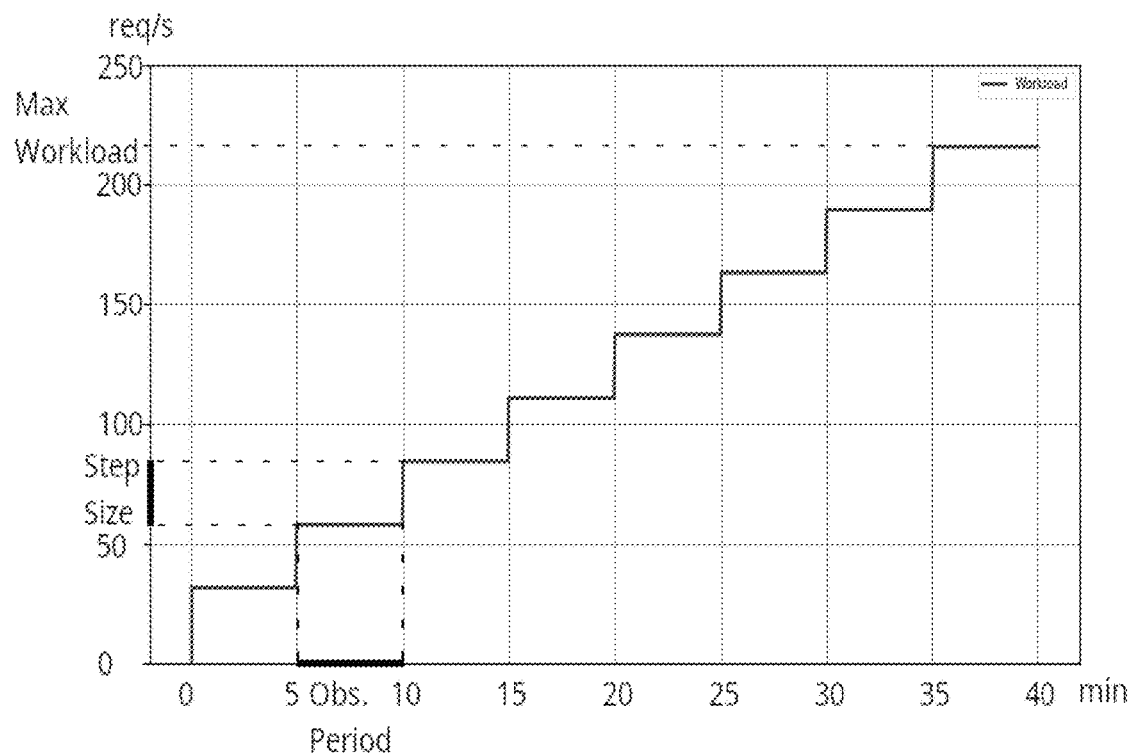
FIG. 13A is a graph representing a stepwise increasing workload normally used to assess the maximum sustainable throughput of a system during performance tests

In the performance testing area, the method used to identify the maximum sustainable throughput of the system is to design a test which applies increasing load levels, step-by-step as shown in FIG. 13A, and monitor the SUT to identify which is the highest load level the system can sustain without violating any service level agreement SLA (e.g. number of errors or response time). This method is usually applied by performance engineers which set the maximum injected throughput for the test by using their own experience, a goal coming from the business or using simple rules like multiplying the production workload by a factor.

This method is deeply subject to the experience of the performance engineer who designs the test and the available information and usually requires many adjustments and re-execution of the performance test before a good load injection pattern is created.

The main challenges involved in this phase are:
Decide the maximum workload to inject in the system (Max Workload)
Discretize the workload increase (i.e. determine how many steps, or the step height, etc.) (Step size)
Determine the duration of each step (Observation Period)

Errors in the definition of these key aspects of the workload design might cause an increase in the time needed to run the test or a failure of the test in identifying the maximum sustainable throughput. Repeating tests and adapting the workload shape manually is a very time consuming and error prone process.

The method of the inventions provides to divide the load injection process into two phases as shown in FIG. 13B:

(a) In the Startup Phase, the method provides to proceed with the performance test using a small Observation Period which can have a time duration, either defined by the user or set to a default small value (for example 1 minute), and a large Step Size ($\Delta_1$) in order to drive the optimization process quickly to the more interesting range of workload.

(b) In the Measurement Phase, the Observation Period is increased to a value which can have a predefined second time duration, larger than the first time duration, either defined by the user or set to default value (for example 5 minutes) and a second Step Size ($\Delta_2$) which is adapted in order to perform the test in a desired number of steps, which number can be defined by the user or set to a default of 6.

Leveraging the model described in the ML model section, the method of the invention can use information on the maximum expected performance along with confidence intervals to automatically define the Step Size to use during the Startup Phase ($\Delta_1$) and the Max Workload. The resulting workload is specifically designed for the performance test required by the optimization process. In such a way the system is driven towards the interesting region of the supported load during the Startup Phase reducing the overall duration of the experiment. Reducing the test time allows the optimization process to evaluate more configurations leading to a more accurate GP which in turn leads to a better exploration of the search space.

The method of the invention provides to use during the Startup Phase the value of the LCB as Max Workload (W1) and the LCB adjusted by a multiplication factor, which is by default ⅓, as Step Size ($\Delta_1$). As shown in the example of FIG. 14C, this leads to the execution of 2 Steps in this phase.

The method of the inventions provides also to use during the Measurement Phase the Upper Confidence Bound (UCB), eventually adjusted by a multiplication factor, as Max Workload (W2).

As shown in the example of FIG. 13C the use of this approach leads to the execution of only two steps with a short duration for the Startup Phase and 6 steps with a longer duration in the Measurement Phase. Considering the same observation period of 5 minutes introduced in the example of FIG. 13A also for steps of the Measurement Phase of FIG. 13C, the use of this method leads to a reduction in the time required for the performance test from 40 minutes to 32 minutes.

Another practical advantage obtained by applying the provided method is that, reducing the time spent in the Startup Phase, enables the execution of more load steps in the Measurement Phase without increasing the overall test execution time. Using more steps, with a corresponding smaller step size, increases the accuracy of the performance test results. This increased accuracy is again a great benefit for the GP and reflects more accurate estimations and better configuration choices.

7. Micro-Benchmarking for Environment Sanity Check

To deal with the environment/platform noise, the method provides to apply a micro-benchmarking process to the SUT before executing actual performance tests.

In particular, at the beginning of an optimization process, the method runs short benchmarks suites designed to assess the raw performance of the underlying IT environment/platform; for example, a tool like "sysbench prime number" is used to benchmark the central processing unit CPU of the IT system, or a tool like "fio" is used to benchmark random/sequential IO performance, etc. By micro-benchmark in this context, it is meant a specific performance test with an ad-hoc designed application and workload which is very fast to execute and gives a reliable performance measurement of a device/IT infrastructure/network. Usually, a micro-benchmark is focused on a specific resource: for instance, some mathematical computation is performed to assess the CPU performance. Another benchmark could be a routine or small program able to write data to a memory, storage, hard-disk to measure its throughput. Also, micro-benchmarks are very short-lived processes that last just a few minutes, tough allowing the execution of multiple instances in a relatively short amount of time.

Thus, the method provides to run one or more micro-benchmarks for each of the most critical resources of the SUT; as an example, such resources include CPU, disk and network devices. The results of the micro-benchmarks are then combined, obtaining a fast way to measure many important performance metrics of the system where the optimization procedure shall be run.

Figure 14:
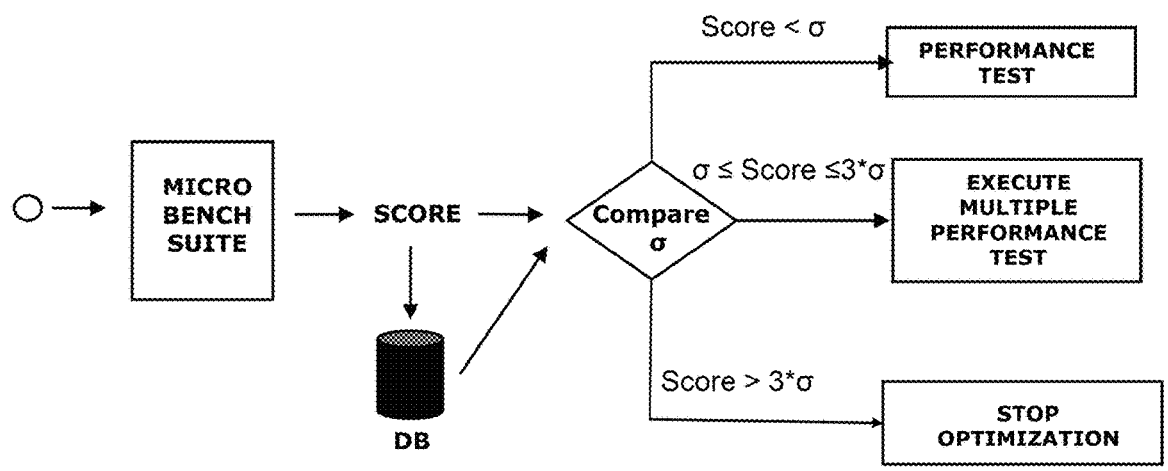
FIG. 14 is a flow diagram representing the proposed method to assess the sanity of an environment using microbenchmarks.

As shown in FIG. 14, at each step of the optimization, the method preferably automatically repeats the measurements embedded in the micro-benchmarking suite and derives an environment/platform variability index of the SUT which gives a picture of how stable and reliable the environment/platform is. This is greatly useful because, as introduced in previous sections, real IT systems can be very noisy and inconsistent, and if these irregularities cannot be properly managed (i.e. identified in advance so as to discard information collected during such noisy behavior) they can have a relevant negative impact on the optimization effectiveness. The method of the invention uses this information to discard noisy experiments and inform the user of the identified instability.

Summarizing, a micro-benchmark is triggered before every performance test and the results are compared with the ones obtained in previous executions.

Before running a performance test on the SUT, the method provides to build an estimate of the distribution of the results of previous micro-benchmarks (e.g. using a Gaussian distribution as a model), run a microbenchmark suite, compare the result of the current benchmark for each resource with the estimated distribution and act upon the result of the comparison.

If the result of at least one of the microbenchmarks is more than 3 standard deviations far from the mean of the estimated distribution, then the environment is considered too noise, the test is aborted and the user is informed of the situation.

If the result of each microbenchmark lies within 1 standard deviation from the mean they are in line with previous execution and the method proceeds with the performance tests.

If the result of at least one of the microbenchmarks lies within 3 standard deviations from the mean, the environment is somewhat noisy. In such a situation the method provides to schedule multiple runs of the performance test.

As it is understood from the above detailed description, the solution of the invention allows to fully achieve the desired results.

In particular, the method of the invention provides a robust optimization process for tuning adjustable parameters of an IT system toward the desired goal.

The method can be employed on production deployments as well as on testing environments, it can adapt to a varying workload or it can focus on a fixed one, it allows to re-use knowledge gathered from past optimizations and it can easily model a variety of systems. Moreover, the modeling of the system can include some domain-specific knowledge if the user so desire. The method relies also on the capacity to understand which the important parameters are to tune among the multitude of modeled ones: this can be done either by exploiting domain-knowledge or by using previous experience when it is available but, in any case, it allows to speed up convergence of the process toward the optimal configuration. The method can deal with noisy systems in different ways, it can detect when a system is in a steady state during a performance test and can be measured; it can also autonomously analyze variability in the results of the test and decide whether a new test is needed. Finally, the method can drive the performance test to allow the IT system to reach its stability.

Although the present disclosure has been described with reference to the specific embodiments, it should be understood that the method and apparatus provided by the present disclosure can have a number of variations and amendments without departing from the scope and background of the present disclosure. The description given above is merely illustrative and is not meant to be an exhaustive list of all possible embodiments, applications or modifications of the invention. Thus, various modifications of the described methods and apparatus of the invention will be apparent to those skilled in the art without departing from the scope of the invention which is defined only by the appended claims.

For example, despite the fact that the description is always mentioning tuning of adjustable parameters in the IT system stack, the method of the invention can be applied not only to configuration parameters, but it can work at any level where a performance-impacting decision has to be taken and where modeling of the real word can be carried out. To apply the method described here to any performance impacting decision a performance engineer needs a SUT against which execute performance tests, a method to apply configuration parameters and an apparatus to generate the incoming workload. In most of the scenarios, these tools are readily available to performance engineers.

The invention claimed is:

1. A computer-implemented method carried out on an information technology framework including at least one processor where workflows, performance metrics and a System Under Test having a set of tunable parameters are defined, an optimizer module, driven by said at least one processor to generate candidate configurations of said System Under Test having a set of tunable parameters, implementing a machine learning model, a configurator module, driven by said at least one processor to at least apply said candidate configurations to said System Under Test, a load generator module, driven by said at least one processor to inject a test workload into said System Under Test to reach a work regime, the at least one processor being configured to gather performance metrics from said System Under Test under said injected test workload, the method comprising:
    identifying a set of tunable parameters representing a candidate configuration for said System Under Test, using the at least one processor through said optimizer module, and applying said candidate configuration to said System Under Test using said configurator module;
    running a performance test on said System Under Test and collecting performance metrics using said at least one processor to determine a performance indicator; and
    supplying said performance metrics to said machine learning model of the optimizer module to generate an optimized candidate configuration,
    wherein said machine learning model uses Bayesian Optimization with Gaussian Processes as a surrogate model that provides as output, corresponding to a candidate set of parameters, both an expected value of said performance indicator and a prediction uncertainty thereof which are used by said optimizer module to build an Acquisition Function which is used to derive a candidate configuration and by said load generator module to build said test workload, and
    said test workload is computed through said machine learning model,
    wherein an output of said machine learning model is further submitted to perform outliers detecting to discard individual performance metrics which are affected by noise in the information technology framework.

2. The computer-implemented method as in claim 1, wherein said outliers detecting is performed by estimating a likelihood quantity of said machine learning model corresponding to a number of past sets of candidate parameters including
    computing a likelihood quantity of said machine learning model after n sets of candidate parameters have been tested,
    removing a set of candidate parameters and computing a modified machine learning model with the remaining (n-1) sets of candidate parameters,
    calculating a modified likelihood quantity of said modified machine learning model and discarding said set of candidate parameters when the modified likelihood quantity is higher than said likelihood quantity,
    repeating said removing and calculating for each of said n past sets of candidate parameters, and
    creating a final machine learning model with only a not discarded set of candidate parameters, to be used for generating an optimized candidate set of tunable parameters.

3. The computer-implemented method as in claim 1, wherein, before said running, evaluating a condition of said System Under Test by performing micro-benchmarks to build a model of an underlying background noise of the information technology environment and determine when said running needs more repetitions or should be aborted.

4. The computer-implemented method as in claim 1, wherein said Acquisition Function is modified in regions where said prediction uncertainty is above a certain uncertainty threshold,
    when the Acquisition Function is to be minimized, the Acquisition Function is set to plus infinity, and
    when the Acquisition Function needs to be maximized, the Acquisition Function is set to zero.

5. The computer-implemented method as in claim 1, wherein a maximum intensity of said test workload is set as an upper confidence bound derived by the machine learning model.

6. The computer-implemented method as in claim 5, wherein the maximum intensity of said test workload is set as the upper confidence bound derived by the machine learning model, adjusted by a first multiplication factor.

7. A non-transitory computer readable medium storing instructions that, when executed by a computer, cause the computer to perform the method as in claim 1.

8. A computer-implemented method carried out on an information technology framework including at least one processor where workflows, performance metrics and a System Under Test having a set of tunable parameters are defined, an optimizer module, driven by said at least one processor to generate candidate configurations of said System Under Test having a set of tunable parameters, implementing a machine learning model, a configurator module, driven by said at least one processor to at least apply said candidate configurations to said System Under Test, a load generator module, driven by said at least one processor to inject a test workload into said System Under Test to reach a work regime, the at least one processor being configured to gather performance metrics from said System Under Test under said injected test workload, the method comprising:
    identifying a set of tunable parameters representing a candidate configuration for said System Under Test, using the at least one processor through said optimizer module, and applying said candidate configuration to said System Under Test using said configurator module;
    running a performance test on said System Under Test and collecting performance metrics using said at least one processor to determine a performance indicator; and
    supplying said performance metrics to said machine learning model of the optimizer module to generate an optimized candidate configuration,
    wherein said machine learning model uses Bayesian Optimization with Gaussian Processes as a surrogate model and provides as output, corresponding to a candidate set of parameters, both an expected value of said performance indicator and a prediction uncertainty thereof which are used by said optimizer module to build an Acquisition Function which is used to derive a candidate configuration and by said load generator module to build said test workload, said test workload is computed through said machine learning model, said test workload is comprised of a Startup Phase and a Measurement Phase, and a Startup Phase maximum workload intensity is set to a lower confidence bound derived by said machine learning model.

9. The computer-implemented method as in claim 8, wherein a step size used during the Startup Phase is the lower confidence bound derived by the machine learning model.

10. The computer-implemented method as in claim 9, wherein the step size used during the Startup Phase is the lower confidence bound derived by the machine learning model, adjusted by another multiplication factor.

11. The computer-implemented method as in claim 8, wherein the Startup Phase maximum workload intensity is set to the lower confidence bound derived by said machine learning model, adjusted by a second multiplication factor.

12. A computer-implemented method carried out on an information technology framework including at least one processor where workflows, performance metrics and a System Under Test having a set of tunable parameters are defined, an optimizer module, driven by said at least one processor to generate candidate configurations of said System Under Test having a set of tunable parameters, implementing a machine learning model, a configurator module, driven by said at least one processor to at least apply said candidate configurations to said System Under Test, a load generator module, driven by said at least one processor to inject a test workload into said System Under Test to reach a work regime, the at least one processor being configured to gather performance metrics from said System Under Test under said injected test workload, the method comprising:
  identifying a set of tunable parameters representing a candidate configuration for said System Under Test, using the at least one processor through said optimizer module, and applying said candidate configuration to said System Under Test using said configurator module;
  running a performance test on said System Under Test and collecting performance metrics using said at least one processor to determine a performance indicator; and
  supplying said performance metrics to said machine learning model of the optimizer module to generate an optimized candidate configuration,
  wherein said machine learning model uses Bayesian Optimization with Gaussian Processes as a surrogate model and provides as output, corresponding to a candidate set of parameters, both an expected value of said performance indicator and a prediction uncertainty thereof which are used by said optimizer module to build an Acquisition Function which is used to derive a candidate configuration and by said load generator module to build said test workload,
  said test workload is computed through said machine learning model, and
  a set of parameters to be selected for optimization is computed by correlating performance metrics of a baseline performance test with historical data and is selected by a sensitivity analysis that measures the sensitivity of a goal metric to a parameter setting, a set of parameters with a highest sensitivity score being selected as the set of parameters for optimization.

13. The computer-implemented method as in claim 12, wherein the sensitivity analysis further measures the sensitivity of key selected performance metrics to another parameter setting, another sensitivity score being used as an impact factor for parameters and parameters with the highest impact factor being selected as the set of parameters for optimization.

14. The computer-implemented method as in claim 13, wherein the number of parameters to be set is 20.

15. The computer-implemented method as in claim 12, wherein a set of parameters not to be selected for optimization is selected by a sensitivity analysis that measures the sensitivity of a goal metric to a parameter setting in relation to a default value of a parameter, a sensitivity score being used as a risk factor and all parameters with a risk factor exceeding a user defined threshold being removed from a set of parameters to be tuned.

16. The computer-implemented method as in claim 12, wherein the number of parameters to be set is 20.

17. The computer-implemented method as in claim 12, wherein a set of parameters not to be selected for optimization is selected by a sensitivity analysis that measures the sensitivity of a goal metric to a parameter setting in relation to a default value of a parameter, a sensitivity score being used as a risk factor and all parameters with a risk factor exceeding a user defined threshold, which is 20%, being removed from a set of parameters to be tuned.

18. An apparatus including an information technology framework comprising:
  at least one processor where workflows, performance metrics and a System Under Test having a set of tunable parameters are defined;
  an optimizer module, driven by said at least one processor to generate candidate configurations of said System Under Test having a candidate set of tunable parameters, implementing a machine learning model;
  a configurator module, driven by said at least one processor to at least apply said candidate configurations to said System Under Test; and
  a load generator module, driven by said at least one processor to inject a test workload into said System Under Test to reach a work regime, the at least one processor being configured to gather performance metrics from said System Under Test under said injected workload,
  wherein said at least one processor, the optimizer module, the configurator module, and the load generator module are configured so that a candidate set of tunable parameters for said System Under Test is identified using the at least one processor through said optimizer module, said candidate set of tunable parameters being applied to said System Under Test using said configurator module,
  a performance test is run on said System Under Test to collect performance metrics using said at least one processor to determine a performance indicator,
  a performance metric is supplied to said machine learning model of the optimizer module to generate an optimized candidate set of tunable parameters, said machine learning model using Bayesian Optimization with Gaussian Processes, said optimizer module is implemented through an Acquisition Function upon generating an optimized candidate set of tunable parameters taking into account both an expected value of said performance indicator and a prediction uncertainty thereof as generated by said machine learning model using Bayesian Optimization with Gaussian Processes, said test workload is computed through said machine learning model, wherein an output of said machine learning model is further submitted to an outliers detection process to discard individual performance metrics which are affected by noise in the information technology framework.

19. The apparatus as in claim 18, wherein said outliers detection process comprises an estimation of a likelihood quantity of said machine learning model in correspondence of a number (n) of past sets of candidate parameters.

* * * * *